United States Patent
George et al.

(10) Patent No.: US 11,989,242 B2
(45) Date of Patent: *May 21, 2024

(54) GENERATING SEQUENTIAL SEGMENTS WITH PRE-SEQUENCE OR POST-SEQUENCE ANALYTICS DATA

(71) Applicant: Adobe Inc., San Jose, CA (US)

(72) Inventors: William Brandon George, Pleasant Grove, UT (US); Kyle W Smith, Highland, UT (US)

(73) Assignee: Adobe Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/653,092

(22) Filed: Mar. 1, 2022

(65) Prior Publication Data
US 2022/0269741 A1    Aug. 25, 2022

Related U.S. Application Data

(63) Continuation of application No. 15/348,707, filed on Nov. 10, 2016, now Pat. No. 11,294,972.

(51) Int. Cl.
*G06F 16/9535* (2019.01)
*H04L 67/02* (2022.01)
*H04L 67/50* (2022.01)

(52) U.S. Cl.
CPC .......... *G06F 16/9535* (2019.01); *H04L 67/02* (2013.01); *H04L 67/535* (2022.05)

(58) Field of Classification Search
CPC .... G06F 16/9535; H04L 67/535; H04L 67/02
See application file for complete search history.

(56) References Cited

U.S. PATENT DOCUMENTS 5,602,981 A * 2/1997 Hargrove .............. G06F 3/0481
715/977
5,627,959 A * 5/1997 Brown ................ G06F 3/04842
715/807
5,671,379 A * 9/1997 Kuse ....................... G06F 9/451
345/419

(Continued)

OTHER PUBLICATIONS

David Carasso, "Exploring Splunk", CITO Research (Year: 2012).*

(Continued)

*Primary Examiner* — Irete F Ehichioya
*Assistant Examiner* — Huen Wong
(74) *Attorney, Agent, or Firm* — Keller Preece PLLC

(57) ABSTRACT

This disclosure generally covers systems and methods that create sequential segments from analytics data to enable investigation of events that occurred before or after a certain sequence of events—that is, pre-sequence or post-sequence events. In particular, certain embodiments of the disclosed systems and methods receive a segment query of certain analytics data to identify events that occurred before or after a defined sequence of events within a network and—in response to the segment query—provide a query result that identifies pre-sequence events or post-sequence events. By providing such query results, the disclosed systems and methods enable users to examine correlations between a sequence of events and any pre-sequence or post-sequence events, including any data associated with those events at a granular level.

20 Claims, 11 Drawing Sheets

(56) References Cited

U.S. PATENT DOCUMENTS

| | | | | |
|---|---|---|---|---|
| 6,430,539 B1* | 8/2002 | Lazarus | | G06Q 30/02 |
| | | | | 705/14.1 |
| 7,085,682 B1* | 8/2006 | Heller | | G06Q 30/02 |
| | | | | 702/186 |
| 7,328,169 B2* | 2/2008 | Temares | | G06Q 30/0204 |
| | | | | 709/224 |
| 7,428,526 B2* | 9/2008 | Miller | | G06Q 10/04 |
| | | | | 707/999.001 |
| 7,844,587 B2 | 11/2010 | Blakely et al. | | |
| 7,941,394 B2 | 5/2011 | Error | | |
| 8,117,202 B1* | 2/2012 | Kozyrczak | | G06F 16/90 |
| | | | | 707/758 |
| 8,295,597 B1* | 10/2012 | Sharma | | G06V 20/41 |
| | | | | 382/173 |
| 8,606,825 B1 | 12/2013 | Matthews et al. | | |
| 8,775,941 B1 | 7/2014 | Deshpande et al. | | |
| 8,898,150 B1 | 11/2014 | Kuramochi et al. | | |
| 9,081,863 B2 | 7/2015 | Error | | |
| 9,367,603 B2* | 6/2016 | Keng | | G06Q 50/01 |
| 9,577,897 B2* | 2/2017 | Dontcheva | | H04L 43/045 |
| 9,875,284 B1 | 1/2018 | Amacker | | |
| 10,459,938 B1* | 10/2019 | Agnew | | G06F 3/0482 |
| 11,403,309 B2* | 8/2022 | Smith | | G06F 16/2471 |
| 2004/0103051 A1 | 5/2004 | Reed | | |
| 2005/0166179 A1* | 7/2005 | Vronay | | G06Q 10/00 |
| | | | | 717/105 |
| 2006/0074953 A1 | 4/2006 | Dettinger et al. | | |
| 2007/0250363 A1 | 10/2007 | Boykin et al. | | |
| 2008/0133570 A1 | 6/2008 | Allen et al. | | |
| 2009/0150261 A1* | 6/2009 | Hogan | | G06Q 30/0643 |
| | | | | 705/26.1 |
| 2009/0182718 A1* | 7/2009 | Waclawik | | G06F 16/335 |
| | | | | 707/E17.046 |
| 2009/0222323 A1* | 9/2009 | Kelly | | G06Q 40/00 |
| | | | | 705/35 |
| 2009/0271327 A1* | 10/2009 | Lal | | G06Q 40/06 |
| | | | | 705/36 R |
| 2011/0125593 A1 | 5/2011 | Wright et al. | | |
| 2011/0246511 A1* | 10/2011 | Smith | | G06F 16/958 |
| | | | | 707/769 |
| 2012/0066065 A1* | 3/2012 | Switzer | | G06Q 30/0255 |
| | | | | 705/1.1 |
| 2014/0297834 A1 | 10/2014 | Tripathi et al. | | |
| 2015/0213631 A1 | 7/2015 | Vander Broek | | |
| 2015/0381454 A1 | 12/2015 | Holtom et al. | | |
| 2016/0125041 A1 | 5/2016 | Smith et al. | | |
| 2016/0283568 A1 | 9/2016 | Praver et al. | | |
| 2018/0129744 A1 | 5/2018 | George et al. | | |
| 2019/0163678 A1 | 5/2019 | Bath et al. | | |

OTHER PUBLICATIONS

Mannila et al., "Discovery of Frequent Episodes in Event Sequences", University of Helsinki, Finland (Year: 1997).*

Wongsuphasawat et al., "LifeFlow: Visualizing an Overview of Event Sequences", CHI 2011 • Session: Visual Analytics (Year: 2011).*

Perer et al., "Frequence: Interactive Mining and Visualization of Temporal Frequent Event Sequences", IBM (Year: 2014).*

David Carasso, "Exploring Splunk", 2012, CITO Research (Year: 2012).

U.S. Appl. No. 15/348,707, Sep. 16, 2019, Preinterview 1st Office Action.

U.S. Appl. No. 15/348,707, Jan. 27, 2020, Office Action.

U.S. Appl. No. 15/348,707, Jan. 19, 2021, Office Action.

U.S. Appl. No. 15/348,707, Jul. 30, 2021, Office Action.

U.S. Appl. No. 15/348,707, Dec. 6, 2021, Notice of Allowance.

* cited by examiner

GENERATING SEQUENTIAL SEGMENTS WITH PRE-SEQUENCE OR POST-SEQUENCE ANALYTICS DATA

CROSS-REFERENCE TO RELATED APPLICATIONS

The present application is a continuation of U.S. application Ser. No. 15/348,707, filed on Nov. 10, 2016. The aforementioned application is hereby incorporated by reference in its entirety.

BACKGROUND

Internet users access millions of websites or applications daily for a variety of purposes. For example, Internet users may access a website or mobile application to make a purchase, locate information, or view entertainment media. Indeed, some Internet users conduct a large portion of their daily tasks using various websites or applications, such as shopping, reading news articles, or finding recipes or restaurants. Users also access the Internet or other networks to transfer files, submit search queries, upload images and other digital media, or send social network posts.

Not only do users routinely access millions of websites or applications a day, but a single website, application, or Uniform Resource Locator may receive thousands to millions of visits or views a day. With such large quantities of network destinations and visits, web administrators and marketers often seek to gather information concerning specific segments of users who visit a website, application, or a collection of websites or applications. In some instances, a web administrator may seek to identify a specific segment of users who have certain characteristics or who have demonstrated a certain pattern of behavior.

Despite the utility of identifying information about specific segments, the amount of analytic data a system may collect for even a single website or application may be unwieldy or too difficult to manage or mine. The amount of data can be particularly problematic for websites or applications that receive thousands or millions of daily visitors or users. Conventional analytics engines often lack the ability to identify and organize captured data in highly specified categories. Even the conventional analytics engines that possess this ability, however, consume significant processing power to create specific segments that satisfy sophisticated query parameters. To identify specific segments for some high-volume websites or applications, some conventional analytics engines or methods may require individually analyzing billions of transactions to identify data representing segments defined by sophisticated query parameters. Without the processing power or time to individually analyze such a large quantity of transactions, some web administrators must manually program code to generate the segment. Such customized segmenting is often time consuming and does not allow the administrator to easily change or revise the segment.

SUMMARY

This disclosure describes one or more embodiments that provide benefits and/or solve some or all of the foregoing (or other) problems with systems and methods that create sequential segments from analytics data that enable investigation of events that occurred before or after a sequence of events—that is, pre-sequence or post-sequence events. For example, certain embodiments of the disclosed systems and methods receive a segment query from a client device that includes both an indication of a sequence of events and a request to identify events that occurred before or after the sequence of events. Upon receiving the segment query, the disclosed systems and methods query an analytics database for a segment of users who performed the sequence of events and for events performed by the segment of users before or after the sequence of events. Based on the query, the disclosed systems and methods provide query results that include analytics data associated with performance of the sequence of events as well as data associated with events that occurred before or after the sequence of events.

Additional features and advantages of one or more embodiments of the present disclosure will be set forth in the description which follows, and in part will be obvious from the description, or may be learned by the practice of such example embodiments.

BRIEF DESCRIPTION OF THE DRAWINGS

The detailed description is described with reference to the accompanying drawings which are briefly described below.

DETAILED DESCRIPTION

Figure 1:
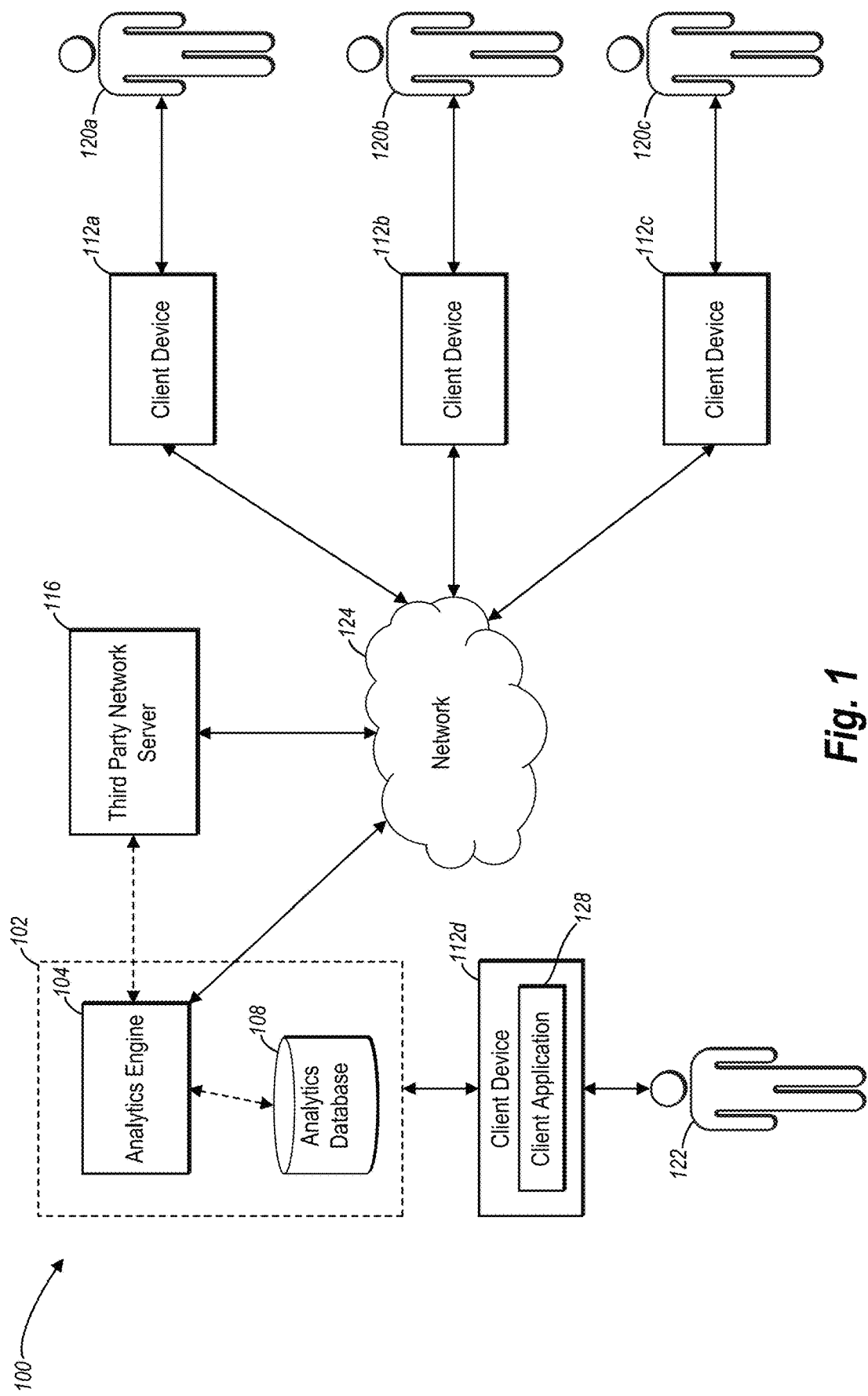
FIG. 1 illustrates a block diagram of an environment in which an analytics system can operate in accordance with one or more embodiments.

This disclosure describes one or more embodiments of an analytics engine that creates sequential segments from analytics data to enable investigation of events that occurred before and/or after a certain sequence of events—that is, pre-sequence and/or post-sequence events. For example, in some embodiments, the analytics engine receives a segment query to identify a segment of users that performed a sequence of events. In response to such a query, the disclosed analytics engine provides a query result that identifies the segment of users as well as pre-sequence events and/or post-sequence events. In some embodiments, the query results likewise include additional analytics data associated with the sequence of events and pre-sequence and/or post-sequence events that provide the ability to further analyze the segment. By providing such query results, the analytics engine returns segments that indicate patterns either before or after (or both before and after) a sequence of events.

More particularly, in one or more embodiments, the analytics engine receives a segment query from a client device that includes both an indication of a sequence of events and a request to identify events that occurred before and/or after the sequence of events. Upon receiving the segment query, the analytics engine queries an analytics database for a segment of users who performed the sequence of events and for events performed by the segment of users before and/or after the sequence of events. Based on the segment query, the analytics engine provides query results that include analytics data associated with performance of the sequence of events by the segment of users and data associated with the events performed by the segment of users before and/or after the sequence of events.

Instead of analyzing potentially billions of transactions—and thereby consuming valuable processing power or multiple computing devices—the disclosed analytics engine identifies segments of users and the events the users performed organized by time sequence. These sequential segments enable the analytics engine to filter events both before and after a queried sequence of events. This filtering captures events that occurs before and/or after the sequence of events, including alternative events users may performed instead of an event of the sequence of events. By contrast, some conventional analytics engines identify pre-sequence or post-sequence events only by repeatedly querying a database for a sequential segment with the query specifically defining each potential pre-sequence or post-sequence event. The disclosed analytics engine avoids this repeated and processer-consuming approach of conventional analytics engines.

By filtering pre-sequence and post-sequence events in a dataset associated with the sequential segment, the analytics engine enables web administrators to identify correlations from Internet users' behavior and take strategic action based on those correlations. For example, when the disclosed analytics engine identifies correlations between a sequential segment and events that occurred before and/or after that sequential segment, the correlations provide a web administrator a basis for altering a website or application design, adjusting advertisement campaigns, hyperlinking other websites or applications, or targeting specific segments of users.

In addition to providing segments that facilitate identifying new correlations, the disclosed analytics engine likewise enables faster queries of segments and more flexibility in examining the segment. By filtering either (or both) events that occurred before or after a sequence of events, the analytics engine provides a granular dataset that enables web administrators to submit segment queries that not only define a sequential segment, but that also identify and categorize (by time sequence) events surrounding the sequential segment. Such queries avoid time-consuming analyses of transactions for each website visitor or network user. The provided granular dataset likewise enables the disclosed analytics engine to query and surface events performed by a large group of network users.

By providing a more granular dataset, the disclosed analytics engine also enables a web administrator to quickly investigate a sequential segment with more flexibility. For example, the analytics engine provides reporting features that-based on user input-display pre-sequence or post-sequence events as defined by a timing relationship, a ranking of most commonly performed pre-sequence or post-sequence events, or specific dimensions of the pre-sequence or post-sequence events.

Figure 2:
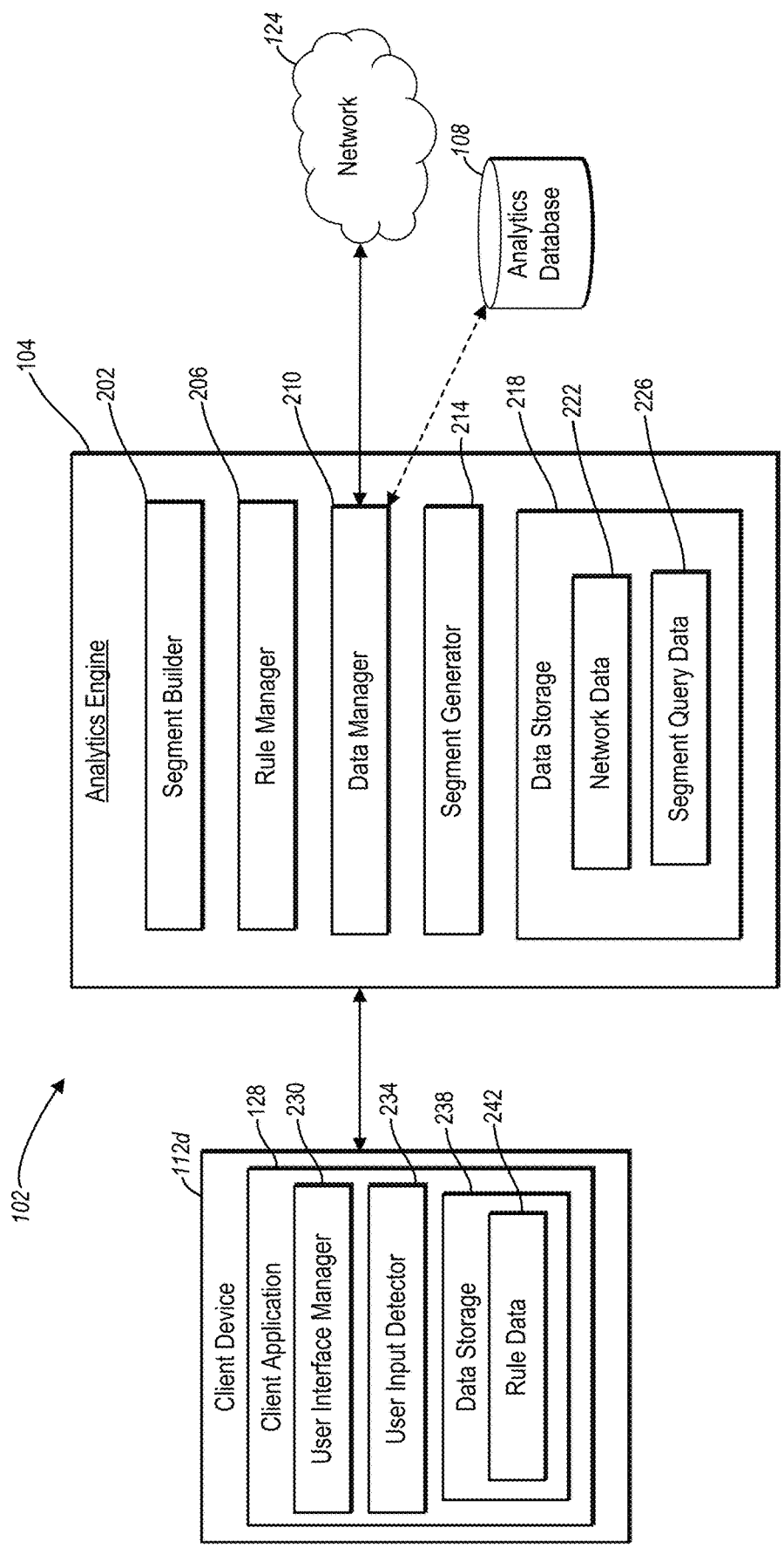
FIG. 2 illustrates a schematic diagram of the analytics system of FIG. 1 in accordance with one or more embodiments.

Turning now to the figures, an overview of an environment in which the analytic engine can operate and an overview of an example architecture of the analytic engine are provided with reference to FIG. 1 and FIG. 2. After providing an overview of the environment and the architecture of the analytic engine, the description includes details on creating sequential segments from analytics data to enable investigation of events that occurred before and/or after a certain sequence of events with reference to FIGS. 3-5.

FIG. 1 is a block diagram illustrating an environment 100 in which the analytic engine 104 can operate in accordance with one or more embodiments. As illustrated in FIG. 1, the environment 100 includes an analytics system 102; client devices 112a, 112b, 112c, and 112d; third party network server(s) 116, such as web server(s); users 120a, 120b, and 120c; an administrator 122; and a network 124, such as the Internet. As further illustrated in FIG. 1, the client devices 112a-112c communicate with the third-party network server(s) 116 and the analytics engine 104 through the network 124. Although FIG. 1 illustrates a particular arrangement of the client devices 112a-112d, the administrator 122, the users 120a-120c, the network 124, the third-party network server(s) 116, and the analytics system 102, various additional arrangements are possible. For example, the client devices 112a-112c may directly communicate with the third-party network server(s) 116 and thereby bypass the network 124. Similarly, the client device 112d may communicate with the analytics system 102 through the network 124 rather than directly communicating with the analytics system.

As shown in FIG. 1, the users 120a-120c comprise users who access one or more websites, applications, content, or support provided (in whole or in part) by the third party server(s) 116. While FIG. 1 illustrates three users 120a-120c, in alternative embodiments, the environment 100 includes fewer or more than three users 120a-120c. In still further embodiments, the environment 100 includes hundreds, thousands, millions, or even billions of users.

As also shown in FIG. 1, the analytics system 102 includes an analytics engine 104 and an analytics database 108. The analytics engine 104 manages and queries data corresponding to some or all of the users 120a-120c. Additionally, in some embodiments, the analytics engine 104 manages and queries data corresponding to other users associated with the third-party network server(s) 116.

In one or more embodiments, the client devices 112a-112c transmit some or all of the data (corresponding to some or all of the users 120a-120c) through the network 124 to the third party network server(s) 116. To generate the transmitted data or initiate communications, the users 120a-120c interact with the client devices 112a-112c, respectively. The client devices 112a-112c may include, but are not limited to, mobile devices (e.g., smartphones, tablets), laptops, desktops, or any other type of computing device, such as those described below in relation to FIG. 8.

Similarly, the network 124 may comprise any of the networks described below in relation to FIG. 8. For example, the network 124 may represent a network or collection of networks, such as the Internet, a corporate intranet, a virtual private network (VPN), a local area network (LAN), a wireless local network (WLAN), a cellular network, a wide area network (WAN), a metropolitan area network (MAN), or a combination of two or more such networks. Thus, the network 106 may be any suitable network over which the client devices 108 (or other components) may access the social networking system 104 or vice versa.

In addition to generating data, the client devices 112a-112c communicate with the third-party network server(s) 116 for a variety of purposes. For example, in one or more embodiments, the client devices 112a-112c communicate with the third-party network server(s) 116 to request a webpage, upload a file, update a profile, download a game, and so forth. Accordingly, in some embodiments, the third-party network server(s) 116 comprise or support a web server, a file server, a social networking system, a program server, an application store, or a content provider. When the third-party network server(s) 116 comprise web server(s) to support an ecommerce business, for example, the client device 112a may communicate with the web server by requesting webpages from the web server for display via a web browser operating on the client device 112a.

In one or more embodiments, the analytics system 102 tracks various user data related to the communications between the client devices 112a-112c and the third-party network server(s) 116. For example, the analytics system 102 tracks user data that includes, but is not limited to, data requests (e.g., URL requests, link clicks), time data (e.g., a time stamp for clicking a link, a time duration for a web browser accessing a webpage, a time stamp for closing an application), path tracking data (e.g., data representing webpages a user visits during a given session), demographic data (e.g., an indicated age, sex, or socioeconomic status of a user), geographic data (e.g., a physical address, IP address, GPS data), and transaction data (e.g., order history, email receipts).

Continuing one of the examples from above, when tracking user data, the third-party network server(s) 116 may comprise a webserver. In some such instances, the client device 112a communicates with the third-party network server(s) 116 to request webpage information to display a certain webpage on the client device 112a. By accessing the communications from the client device 112a to the third-party network server(s) 116, the analytics system 102 tracks the information request (e.g., for the webpage), the time the request was made, the geographic information associated with client device 112a (e.g., a geographic area associated with an IP address assigned to the client device 112a or GPS information identifying a location of the client device 112a), and any demographic data associated with the user 120a.

The analytics system 102 tracks user data in various ways. In one or more embodiments, the third-party network server(s) 116 tracks the user data and then reports the tracked user data to an analytical server, such as the analytics engine 104 illustrated in FIG. 1. Alternatively, the analytics system 102 receives tracked user data directly from the client devices 112a-112c. In particular, the analytics system 102 may receive information via data stored on the client device (e.g., a browser cookie, cached memory), embedded computer code (e.g., tracking pixels), a user profile, or engage in any other type of tracking technique. Accordingly, the analytics engine 104 can receive tracked user data from the third-party network server(s) 116, the network 124, and/or the client devices 112a-112c.

To process a sequential segment query, in some embodiments, the analytics engine 104 identifies all fallout checkpoints from the user data with, for example, each unique dimension+item or event associated at each node. For example, the analytics engine 104 creates a sequencing stream with each of the checkpoints (e.g., dimension+item1 THEN dimension+item2 THEN dimension+item3). The analytics engine 104 then applies this sequencing stream to either a visitor or visit context.

As used in this disclosure, a "segment" or "segment of users" refers to a group of users whose network activities have been tracked and stored in a database. For example, a segment of users may comprise of a subgroup of users whose activities satisfy or are responsive to a segment query. In one embodiment, the analytics engine 104 tracks and stores information related to activities of certain users (e.g., uses of a mobile application, website paths utilized by the website users, clicks per minute, time spent on a single webpage, purchases made). An administrator may then submit a query of the stored information to retrieve a specific segment of the users who, for example, made a purchase within five minutes of first visiting the website. In some embodiments, the analytics engine 104 returns a range of information related to users whose actions on the website are responsive to the query. Using this returned information, the administrator can more closely analyze the returned segment of users to determine how to improve the website for users who make quick purchases. A segment of user can be visitor or visit based. In other words, a segment of users can comprise a list of unique users who performed the segment defining event (i.e., visitor based). Alternatively, a segment of users can comprise a list of visits in which the segment defining event was performed (i.e., visit based), which can include multiple visits by the same user.

Accordingly, as used in this disclosure, a "segment query" refers to a request for information from a database that is related to a segment of users. For example, a segment query may refer to a structured group of parameters that indicate specific types of information that should be identified within the database. In one or more embodiments, a segment query includes an indication of a sequence of events, sequential conditions, unique dimension item values, frequency conditions, and so on to return a specific and granular level of information from the database.

In many of the embodiments described in this disclosure, however, a segment query further includes a request for events that occurred before or after a sequence of events—that is, pre-sequence events or post-sequence events. In some embodiments, a component of the analytics engine generates the request for pre-sequence or post-sequence events. Additionally or alternatively, a user may initiate the request for pre-sequence or post-sequence events using, for example, various segment query building controls described below. Regardless of how the request is generated, the request for pre-sequence or post-sequence events may include sequential conditions, unique dimension item values, frequency conditions, and so on to return a specific and granular level of information from the database.

Relatedly, an "event" is an action performed by a user or a result of actions by a user that can be tracked and stored. For example, events include, but are not limited to, an application use, a webpage view, a product purchase, a web search, a link click, an application download, an amount of time spent on a given webpage, a first time visit, a visitor from a search engine or a social networking site, revenue being over a certain amount, a number of units purchased, etc. Accordingly, a "sequence of events" is two or more events performed or that occur in a specific order. For example, a sequence of events may include two or more events defined by a dimension item value, such as an initial event comprising a visit to a first webpage and a subsequent event comprising a visit to a second webpage.

A "dimension" refers to a component or category of data. Example dimensions include products, webpages, gender, geographic locations, purchases, downloads, age, or campaigns. A "dimension item value" refers to a particular item in a dimension. For example, a dimension item value can be a particular product, webpage, gender, geographic location, purchase, download, or page.

In some embodiments, the analytics engine 104 parses a segment query into a segment definition format that the analytics engine 104 can apply to metric data. For example, in a path-match scenario, the analytics engine 104 automatically creates a segment by identifying all events matched in a path. The path may, for example, contain wildcard characters with constraints such as "any 1 page" or "any 2 pages." The analytics engine 104 then creates a sequencing stream with each of the events. The sequencing stream can include special rules for wildcard characters, such as "Page exists AND Page Depth=1" within a separate container. The analytics engine 104 then applies this sequencing stream to either a visitor or visit context.

Also illustrated in FIG. 1, the analytics engine 104 is communicatively coupled to an analytics database 108. In one or more embodiments, the analytics engine 104 stores tracked user data to and queries tracked user data from the analytics database 108. In one or more embodiments, the analytics database 108 is separately maintained from the analytics engine 104 as shown in FIG. 1. Alternatively, in one or more embodiments, the analytics engine 104 and the analytics database 108 comprise a single combined system, subsystem, or device.

As also shown in FIG. 1, the environment 100 includes a client device 112d that implements a client application 128. In one or more embodiments, an administrator 122 or other user queries data from the analytics engine 104 by using the client device 112d. For example, in some embodiments, the analytics engine 104 provides various graphical user interface controls to the client application 128 within the client device 112d to enable the administrator 122 to create segment queries. Additionally, in some embodiments, the analytics engine 104 receives and processes segment queries from the client application 128 and provides query results based on the segment query. This process is described in greater detail below with reference to FIGS. 2 and 3.

FIG. 2 illustrates a schematic diagram of one embodiment of the analytics system 102. As shown, the analytics system 102 included, but is not limited to, the analytics engine 104 communicatively coupled to the network 124 and the analytics database 108. The analytics system 102 also includes or supports a client application 128 running on the client device 112d. As shown in FIG. 2, the analytics engine 104 includes, but is not limited to, a segment builder 202, a rule manager 206, a data manager 210, a segment generator 214, and a data storage 218. In some embodiments, the analytics system 102 includes or is coupled to the analytics database 108, as indicated by the dotted line in FIG. 2.

Although FIG. 2 illustrates the components 108 and 202-218 to be separate, any of the components 108 or 202-218 may be combined into fewer components, such as into a single facility or module or divided into more components as may be suitable for one or more embodiments. In addition, the components 108 and 202-218 may be located on or implemented by one or more computing devices, such as those described below in relation to FIG. 8.

As shown in FIG. 2, components 108 and 202-218 can comprise software or hardware or a combination of software and hardware. For example, the components 108 and 202-218 can comprise one or more instructions stored on a non-transitory computer readable storage medium that are executable by a processor of one or more computing devices. When executed by the one or more processors, the computer-executable instructions of the analytics system 102 cause computing device(s) to perform the methods described herein. Alternatively, the components 108 and 202-218 can comprise a special-purpose processing device to perform a certain function. Additionally or alternatively, the components 108 and 202-218 can comprise a combination of computer-executable instructions and hardware.

As mentioned above and as shown in FIG. 2, the analytics engine 104 includes a segment builder 202. The segment builder 202 communicates with the client application 128 to receive user inputs and provide segment query building controls. The segment query building controls facilitate building or configuring a segment query. For example, in one or more embodiments, a user may begin building a segment query by indicating what type of segment query the user wants to build. In response to receiving the indication of the type of segment query, the segment builder 202 determines the appropriate segment query building controls applicable for the type of segment query and provides the appropriate segment query building controls to the client application 128. Additionally or alternatively, the segment builder 202 also receives and formats drag-and-drop segment query building controls to build a segment query.

As used herein, a "segment query building control" refers to any type of interactive input control included as part of a graphical user interface. For example, segment query building controls include, but are not limited to, text boxes, drop down lists, radio buttons, spinners, keyboards, and numerical keypads. To facilitate building a segment query, some embodiments of the segment builder 202 provide and/or format certain combinations of segment query building controls to the client application 128. Such combinations assist a user in building a segment query with appropriate values, formatting, grammar, or other inputs.

For example, the client device 112d may send an indication to build a sequential segment query. In other embodiments, the client device 112d may send a more specific indication to build a sequential segment query that, when processed by the analytics engine 104, identifies users who visited a number of websites in a specific order within a specific time-frame and events performed by the users before or after they visited the websites. In response to either indication, the segment builder 202 provides segment query building controls that facilitate configuring a segment query.

For example, in some embodiments, the segment builder 202 provides segment query building controls for the user to indicate events within a sequence of events. In response to a more specific indication described above, the segment builder 202 may provide segment building controls for the user to indicate websites, configure the specific order in which the websites were visited, the specific time frame for the visits, and a request to identify events that occurred before or after the users visited the websites. By providing such specific building controls, the segment builder 202 can help prevent the user from configuring segment query portions outside the scope of the originally indicated segment query. As such, the segment builder 202 guides the user in configuring a segment query that is specifically tailored to the user's intentions.

In some embodiments, the segment builder 202 receives or provides segment query building controls for an initial portion of a segment query. After providing controls for the initial portion, the segment builder 202 provides an additional portion of the segment query by default or based on a configuration of the initial portion of the segment query. To continue the example from above, in some embodiments, the segment builder 202 provides segment query building controls for the user to indicate websites or other dimensions, configure the specific order in which the websites were visited, and the specific time frame for the visits. Based on the inputs received using the segment query building controls, the segment builder 202 may independently add a request to identify events that occurred before or after the users visited the two websites. By adding a request to identify pre-sequence or post-sequence events, the segment builder 202 builds a segment query that calls for a more granular and broader dataset.

The segment builder 202 receives segment queries configured by the client application 128 from the client device 112d. For example, in one or more embodiments, the client device 112d may send a segment query configured by the client application 128 to the analytics engine 104 for the segment builder 202 to use to build a segment query. In one or more embodiments, the segment builder 202 may receive the configured segment query and pass the configured segment query to the rule manager 206 for further processing.

As shown in FIG. 2, the analytics engine 104 includes the rule manager 206. The rule manager 206 receives and parses a configured segment query from the segment builder 202, as well as performs a final error check on the configured segment query. When parsing a configured segment query, the rule manager 206 can separate the segment query into portions for analysis. Although certain embodiments of the segment builder 202 help prevent the user from configuring segment query portions outside the scope of the originally indicated segment query, a completed segment query sometimes contains errors related to syntax, format, or other components. To identify such errors, the rule manager 206 parses the configured segment query to determine whether the query satisfies various rules of structure and format for queries submitted to a database, such as those associated with a structured query language. Thus, the rule manager 206 can help ensure that the analytics engine 104 properly processes the configured segment query without causing any run-time errors.

In some embodiments, the rule manager 206 also arranges and presents the configured segment query in a format that facilitates processing by the analytics engine 104. For example, in one or more embodiments, the configured segment query received from the client application 128 may include one or more unique dimension item values. As used herein, a "unique dimension item value" refers to a user-defined variable.

For instance, the analytics engine 104 may receive a configured segment query that identifies a segment of website visitors who visit a first page and then immediately visit a second page and make two purchases on the second page. In this case, "purchases" is a unique dimension item value that, without definition, may refer to any product. To more narrowly refine the results of this search query, the rule manager 206 may instruct the segment builder 202 to provide additional segment query building controls. For example, the rule manager 206 may instruct the segment builder 202 to provide a segment query building control that permits the user to submit a definition for the dimension item value "purchases," such as "where purchases equal a bike, a TV, or a computer." The additional segment query building control (and accompanying definition) narrows the segment query to website visitors who visit a first page and then immediately visit a second page and make two purchases on the second page, where purchases equal a bike, a TV, or a computer.

Additionally, the rule manager 206 likewise can arrange and present a portion of the configured segment query that identifies pre-sequence events or post-sequence events in a format that facilitates processing by the analytics engine 104. For example, upon receiving a configured segment query that includes a request for pre-sequence events, the rule manager 206 may instruct the segment builder 202 to provide an additional segment query building control that defines the pre-sequence event, such as by dimension or by a time relationship with an event within a sequence of events defined by segment query building controls.

As mentioned above and as shown in FIG. 2, the analytics engine 104 also includes a data manager 210. The data manager 210 receives, organizes, and/or stores user data from the network 124, the third-party network server(s) 116, and/or the client devices 112a-112c (e.g., the data manager 210 performs read/write functions in connection with a database). For example, in one or more embodiments, the analytics engine 104 receives user data related to website usage provided or supported by the third-party network server(s) 116. Such user data may include, but is not limited to, click data, timestamp data, demographic data, geographic data, or transactional data. In one or more embodiments, the data manager 210 organizes this data according to any of the data type, the user, the timestamp, or some other variable. Once organized, the data manager 210 stores the received user data in the analytics database 108.

The data manager 210 also identifies information within the analytics database 108 based on a segment query. As described above, the rule manager 206 finalizes segment queries and sends those queries to the data manager 210 for processing. In one or more embodiments, the data manager 210 receives a segment query from the rule manager 206 and queries the analytics database 108 to identify stored user data that satisfies the received segment query.

For example, the data manager 210 analyzes a dataset within the analytics database 108 to identify a segment of users who performed a sequence of events that satisfies a segment query. In some cases, the data manager 210 iterates through transactional data within the dataset row by row to identify the segment of users who performed the sequence of events. Additionally, in some embodiments, the data manager 210 also analyzes the dataset within the analytics database 108 to identify events that the segment of users performed either before or after they performed the sequence of events. In some such cases, the data manager 210 iterates through data associated with each user of the segment of users (or each event associated with the segment of users) to identify any events that each user performed either before or after they performed the sequence of events. In such cases, the data manager 210 iterates through data within the dataset that is associated with the either the segment of users that satisfies the segment query or events that satisfy the segment query.

Once the appropriate user data has been identified, the data manager 210 generates a defined dataset that includes data satisfying the segment query. As used in this disclosure, the term "defined dataset" refers to an organized set of data that is responsive to a segment query. For example, a defined dataset may include data queried from within the analytics database 108 that satisfies a segment query, including data describing various dimensions of a segment of users (e.g., browser, age, gender of a segment of users and events performed both before and after a defined sequence of events). In some embodiments, the data manager 210 generates a defined dataset that includes analytics data associated with the segment of users performing the sequence of events and analytics data associated with any instances of events the segment of users performed either before or after (or both before and after) the sequence of events. For example, the data manager 210 may generate a defined dataset that includes data associated with website visitors who visited a home page of a website and a product page within the same website—as well as any webpages the website visitors visited after the product page. Upon generating a defined dataset, the data manager 210 optionally stores the query results as the defined dataset for later access.

As mentioned above, a segment query refers to a request for information from a database. More specifically, a segment query refers to a structured group of parameters that indicate a specific type of information that the data manager 210 identifies within the analytics database 108. For example, some embodiments of the rule manager 206 format segment queries according to any type of query language (e.g., SQL, Datalog, COQL, HTSQL, XQuery), or in any manner suitable for extracting information from a database.

The data manager 210 processes segment queries that include a wide range of parameters. For example, the data manager 210 processes a segment query that refers to one or more user events, such as a sequence of two events, and includes a request for any events that occurred before or after the sequence of events. In one or more embodiments, a user event is an action performed by a user that is tracked (e.g., a click, a purchase, a page landing, a search, a download). In some embodiments, the data manager 210 processes sequential segment queries. A "sequential segment query" is a query that identifies users who perform certain events in a certain order. For example, a sequential segment query may cause the data manager 210 to identify users who view a first webpage, then view a second webpage, and then view a third webpage. In some embodiments, the sequential segment query specifies a time relationship between or among events, such as a sequential segment query that causes the data manager 210 to identify users who view a first webpage, then next view a second webpage, and then next view a third webpage. In the latter case, the sequential segment query specifying a time relationship may not cause the data manager 210 to identify users who viewed the first, second, and third pages with other pages interspersed. Likewise, this query may not cause the data manager 210 to identify users who looked at the first, second, and third pages in any other sequence.

As mentioned above, the analytics engine 104 includes a segment generator 214. The segment generator 214 receives segment query results from the data manager 210, formats the segment query results, and provides the formatted segment query results to the client application 128. For example, in one or more embodiments, the data manager 210 identifies a wide range of user data in the analytics database 108 that satisfies a segment query. In its raw form, however, the identified user data may mean much or be unintelligible to a user. The segment generator 214 generates a meaningful representation of the identified data.

For example, using a simplified version of a segment query discussed above, the data manager 210 identifies user data in the analytics database 108 that satisfies a segment query calling for website visitors who visit a first page and then immediately visited a second page and made two purchases on the second page. User data that satisfies this segment query may identify users who performed the queried events today, users who performed the queried events last week, and users who performed the queried events last year. Accordingly, in one or more embodiments, the segment generator 214 creates a segment report that organizes the identified users chronologically with three separate groups corresponding to users who performed the queried events today, last week, and last year.

Additionally or alternatively, in some embodiments, the segment generator 214 includes other types of information associated with the identified users such as, but not limited to, profile data associated with the identified users, demographic data associated with the identified users, geographic data associated with the identified users, and so on. In one or more embodiments, the segment generator 214 presents query results in various formats, such as in text, in charts, or in graphs. The segment generator 214 thus provides meaningful information to the client application 128, rather than a simple list of data results. This disclosure further describes examples of reports generated by the segment generator 214 below in connection with FIGS. 4A-4D and 5.

As also shown in FIG. 2, the analytics engine 104 includes a data storage 218. The data storage 218 maintains network data 222 or segment query data 226. In one or more embodiments, network data 222 includes user data identified by the data manager 210 that satisfies a segment query. For example, in some embodiments, the analytics engine 104 stores network data 222 that includes a defined dataset satisfying the segment query within the data storage 218. Furthermore, in one or more embodiments, the segment query data 226 includes segment queries received by the analytics engine 104, as well as corrected or simplified segment queries and dimension item value definitions utilized by the data manager 206. In some embodiments, the data storage 218 organizes the network data 222, such as a defined dataset, and the segment query data 226 such that query results stored as network data 222 correspond to their associated segment query in the segment query data 226.

As mentioned above, the analytics system 102 also includes or supports the client application 128 operating on the client device 112*d*. As shown in FIG. 2, the client application 128 includes, but is not limited to, a user interface manager 230, an input detector 234, and a data storage 238. In general, the analytics system 102 enables the administrator 122 of the client device 112*d* to use the analytics engine 104 via the client application 128 to format a segment query. Additionally, the analytics system 100 enables the administrator 122 of the client device 112*d* to receive query results from the analytics engine 104 via the client application 128.

As shown in FIG. 2, the components 230-238 can comprise software or hardware or a combination of software and hardware. For example, the components 230-238 can comprise computer instructions stored on a non-transitory computer-readable storage medium that are executable by at least one processor of the client device 112*d*. When executed by the at least one processor, the computer-executable instructions cause the client device 112*d* to perform the methods and processes described herein. Alternatively, the components 230-238 can comprise a special purpose processing device to perform a certain function or group of functions. Additionally or alternatively, the components 230-238 can comprise a combination of computer-executable instructions and hardware.

In one or more embodiments, the client application 128 comprises a native application installed on the client device 112*d*. For example, in some embodiments, the client application 128 comprises a mobile application that installs and runs on a mobile device, such as a smart phone or a tablet. Alternatively, in other embodiments, the client application 128 comprises a desktop computer application, widget, or other form of a native computer program. Alternatively, the client application 128 comprises a remote application that the client device 112*d* accesses. For example, the client application 128 may be a web application that is executed within a web browser of the client device 112*d*.

As shown in FIG. 2, the client application 128 includes a user interface manager 230. In certain embodiments, the user interface manager 230 provides, manages, and/or controls a graphical user interface (or simply "user interface")

that enables a user to compose segment queries and receive segment query results and reports from the analytics engine 104. For example, the user interface manager 230 provides a graphical user interface that facilitates composition of a segment query. Likewise, in some embodiments, the user interface manager 230 provides a graphical user interface within which the client device 112d displays segment query results provided by the analytics engine 104.

More specifically, in some embodiments, the user interface manager 230 facilitates the display of a user interface using a display device associated with the client device 112d. For example, the user interface can comprise a plurality of graphical components, objects, and/or elements that enable a user to interact with the analytics engine 104. In particular, the user interface manager 230 may direct the client device 112d to display a group of graphical components, objects, and/or elements as directed by the segment builder 202 of the analytics engine 104.

For instance, in response to a user indicating a specific type of segment query, the segment builder 202 may provide a variety of segment query building controls to the user interface manager 230, and the user interface manager 230 may in turn display those segment query building controls to the administrator 122 of the client application 128. Similarly, the user interface manager 230 may receive and display updates to query building controls provided by the segment builder 202. Accordingly, under the direction of the segment builder 202, the user interface manager 230 can display or remove from display various segment query building controls to assist a user in configuring or building a segment query.

Additionally, in some embodiments, the user interface manager 230 displays certain segment query results. For example, as described above, the segment generator 214 formats raw data or a defined dataset that the data manager 210 identified as responsive to a segment query. In other words, the segment generator 214 formats raw data or defined datasets into charts, graphs, textual summaries, reports, or other presentation formats. For example, in some embodiments, the segment generator 214 formats a defined dataset into a flow report or a fallout report, as described further below in connection with FIGS. 4A-4D and 5. In one or more embodiments, the segment generator 214 provides the formatted raw data or formatted defined dataset to the user interface manager 230 for display to the administrator 112.

As further illustrated in FIG. 2, the client application 128 includes a user input detector 234. In one or more embodiments, the user input detector 234 detects, receives, and/or facilitates user input in any suitable manner. In some embodiments, the user input detector 234 detects one or more user interactions between the administrator 122 (or some other user) with the graphical user interface. As referred to herein, a "user interaction" refers to a single interaction, or combination of interactions, received from a user with one or more input devices.

For example, in some embodiments, the user input detector 234 detects a user interaction from a keyboard, mouse, touch pad, touch screen, and/or any other input device. In the event the client device 112d includes a touch screen, the user input detector 234 detects one or more touch gestures (e.g., swipe gestures, tap gestures, force touch gestures, touch-and-press gestures, pinch gestures, or reverse pinch gestures) from a user who inputs a user interaction. In some examples, a user can provide the touch gestures in relation to and/or directed at one or more graphical objects or graphical elements of a graphical user interface.

Additionally, in some embodiments, the user input detector 234 additionally or alternatively receives data representative of a user interaction. For example, the user input detector 234 may receive one or more user configurable parameters, one or more user commands, and/or any other suitable user input from a user through a data input device. The user input detector 234 may receive input data from one or more components of the client application 128, the storage on the client device 112d, or one or more remote locations (e.g., the analytics engine 104).

In response to the user input detector 234 detecting user input and/or receiving other data, the client application 128 performs one or more functions. Generally, a user can control, navigate, and otherwise use the client application 128 by providing one or more user inputs that the user input detector 234 can detect. For example, in response to the user input detector 234 detecting user input, one or more components of the client application 128 provide data for display on the graphical user interface, interact with segment query building controls, or submit segment queries. Similarly, in response to the user input detector 234 detecting user input, one or more components of the client application 128 provide a user with navigation controls to navigate through one or more graphical user interfaces to build or configure a segment query.

For example, the client application 128 facilitates the analytics engine 104 in assisting a user in building a segment query in response to the user input detector 234 detecting one or more user inputs. A user may provide input (e.g., via a button click or a list item selection) indicating a type of segment query the user desires to build. In response to the user input detector 234 detecting the input, the segment builder 202 may provide segment query building controls to the user interface manager 128 appropriate for the type of segment query indicated. After providing segment query building controls, the user input detector 234 may detect further inputs from the user, which in turn, prompt the segment builder 202 to provide further updates that the user interface manager 230 displays on the graphical user interface. Accordingly, in response to the user input detector 234 detecting user input, the client application 128 guides a user in appropriately configuring a segment query.

As also mentioned above and illustrated in FIG. 2, the client application 128 includes a data storage 238. The data storage 238 stores and maintains rule data 242 representative of segment queries, dimension item value definitions, and query results as described above. For example, a user may select a previously configured segment query stored as rule data 242, and submit the previously configured segment query to the analytics engine 104 with new definitions for the dimension item values included in the segment query. Accordingly, the user may utilize a stored query to identify new query results.

Figure 3:
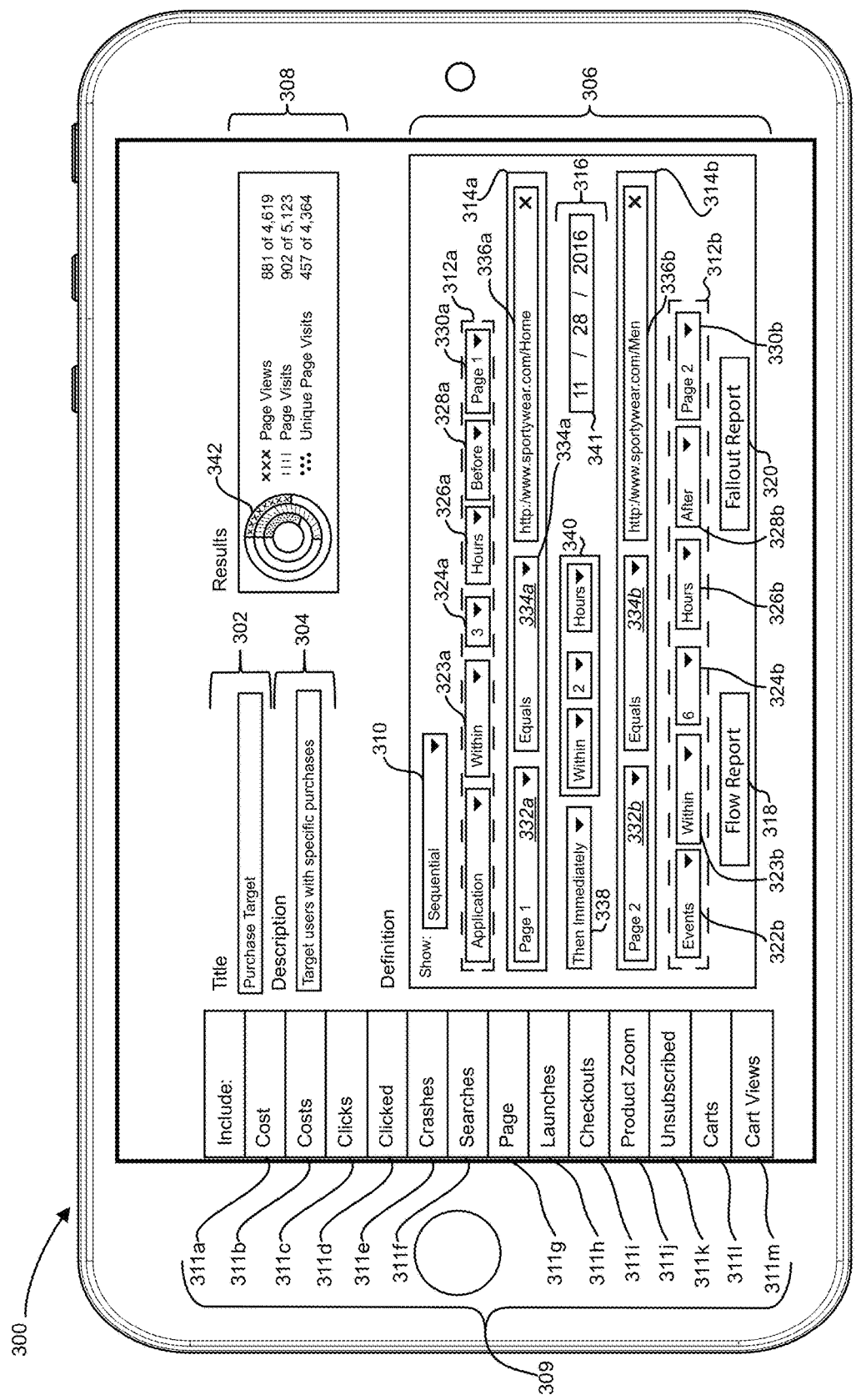
FIG. 3 illustrates a view of a segment generation user interface in accordance with one or more embodiments.

As described above, the segment builder 202 may provide segment query building controls to the client application 128 to assist a user in building a segment query. FIG. 3 illustrates several segment query building controls provided by the segment builder 202. For example, FIG. 3 illustrates a segment query building GUI 300. In some embodiments, the segment query building GUI 300 includes one or more of the features disclosed by U.S. Pat. No. 8,135,722, the entire contents of which are hereby incorporated by reference. As shown in FIG. 3, however, the segment query building GUI 300 includes a title field 302, a description field 304, a segment query canvas 306, and a results summary display 308. In one or more embodiments, the segment builder 202 provides each of the features 302-308, which may include one or more interactive input controls and/or segment query building controls.

In one or more embodiments, the title field 302 includes a label (e.g., "Title") as well as a text input box. In one embodiment, for example, a user may input a title for the segment query that she is building into the text input box of the title field 302. Additionally or alternatively, the title field 302 includes other input controls such as check boxes or radio buttons.

Also as illustrated in FIG. 3, the segment query building GUI 300 includes a description field 304. In one or more embodiments, the description field 304 includes a label (e.g., "Description") as well as a text input box. A user may input a description for the segment query in the text input box of the description field 304. For example, a user may input a description that generally describes the segment of users that the user intends to cover with the segment query. Additionally, the description field 304 can include other controls for a user to specify a type associated with the segment query or additional information related to the segment query.

As mentioned above, in some embodiments, when the user submits a completed segment query to the analytics engine 104 for processing, the analytics engine 104 may store the segment query in the segment query data 226 for future use. In some such cases, the data storage 218 stores the submitted segment query according to the title entered in the title field 302 or to the description entered in the description field 304. Similarly, in one or more embodiments, the client application 128 stores rule data 242 associated with the segment query illustrated in FIG. 3 according to the title entered in the title field 302 or to the description entered in the description field 304. Thus, in one or more embodiments, a user may retrieve the segment query illustrated in FIG. 3 from the rule data 242 and/or the segment query data 226 to edit and/or process the segment query at a future time.

In some embodiments, the analytics engine 104 uses the title entered in the title field 302 or the description entered into the description field 304 to retrieve a stored segment query from data storage 218. For example, a user may wish to run a segment query that was previously built and stored in either the data storage 238 of the client application 128 or the data storage 218 of the analytics engine 104. However, the user may not remember the title for the desired segment query, and accordingly must search for it. In one embodiment, the user may enter search terms into a search box (not shown), and prompt the client application 128 and/or the analytics engine 104 to search for stored segment queries responding to the entered search terms in the segment query data 226. In some such cases, the client application 128 and/or the analytics engine 104 search through the segment query descriptions that are associated with the stored segment query data 226 to find segment queries that correspond to the search terms.

As mentioned above, the segment query building GUI 300 includes a segment query canvas 306. As shown in FIG. 3, for example, the segment builder 202 provides various segment query building controls 310 and 318-341 within the segment query canvas 306. As described above, the segment builder 202 can provide each of the segment query building controls 310 and 318-341 in response to detected user input to guide and assist the user in building a segment query. For example, when the user initially accesses the client application 128 to build a segment query, the segment query canvas 306 of the segment query building GUI 300 may be mostly or entirely empty.

As shown in FIG. 3, for example, the segment builder 202 initially provides a type drop down list 310 within the segment query canvas 306. In one or more embodiments, the type drop down list 310 includes a list of possible segment query types. For example, a list of possible segment query types includes, but is not limited to, a "sequential" segment query type. In one or more embodiments, the type of a segment query may generally refer to the type of segment query that will be included in the segment canvas 206.

In response to the user selecting the segment query type "sequential" in the type drop down list 310 (or dragging or dropping a type control into the segment query canvas 306), the segment builder 202 provides additional segment query building controls (within the segment query building GUI 300) to guide the user in building a segment query of this type. As shown in FIG. 3, for example, the segment builder 202 provides the event control 314a. The event control 314a includes segment query building controls that enable the user to define a specific event to include in the segment query.

Additionally or alternatively, in some embodiments, the segment builder 202 of the analytics engine 104 also provides an event list 309. As shown in FIG. 3, the event list 309 includes one or more selectable drag-and-drop event options 311a-311m. The selectable drag-and-drop event options 311a-311m represent merely examples of the type of events a segment query may target. In one or more alternative embodiments, the event list 309 is scrollable and includes more selectable drag-and-drop event options than shown in FIG. 3.

A user can build a segment query by dragging and dropping one or more of the selectable drag-and-drop event options 311a-311m into the segment query canvas 306. For instance, in response to a user dragging and dropping one or more of the selectable drag-and-drop event options 311a-311m into the segment query canvas 306, the segment builder 202 provides sub-elements related to the event option 311a-311m. FIG. 3 illustrates the segment builder 202 providing some such sub-elements. In response to the user dragging and dropping the selectable drag-and-drop event option 311g into the segment query canvas 306, the segment builder 202 provides the event control 314a.

Alternatively, in some embodiments, a user can build a segment query by interacting with the event control 314a. In one or more embodiments, the segment builder 202 provides the event control 314a to the segment query canvas 306 without receiving any drag-and-drop event options. In some such embodiments, the segment builder 202 provides an event type drop down list 332a, an operator type drop down list 334a, and an event specification text box 336a within the event control 314a. Moreover, in one or more embodiments, the segment builder 202 provides the event control 314a one segment query building control at a time. For example, in response to the user selecting an event type in the event type drop down list 332a, the segment builder 202 provides additional segment query building controls within the event control 314a.

Regardless of the circumstances under which the segment builder 202 provides the event control 314a, the event control 314a enables the user to select a different event for a segment query or further define a specific event (after dragging and dropping one of the selectable drag-and-drop event options 311a-311m) for inclusion in a segment query using the input controls 332-336. For example, in one embodiment, the event type drop down list 332a includes a list of possible types of events that a user may perform. Possible events include, but are not limited to, "application"

(e.g., a mobile application use, a feature within a mobile application), "page" (e.g., a page landing or page visit), "download" (e.g., a user downloads a file), "upload" (e.g., the user uploads a file), "transaction" (e.g., a purchase button click, an instant message send, a search query submit), and so forth. Additionally, in some embodiments, the event type drop down list 332a includes multiples of the same type of possible event, such as enumerated events as "application 1" and "application 2" or "page 1" and "page 2." In some such embodiments, the multiples of the same type of event help clarify an order for a sequence of events or enable the analytics engine 104 to specify pre-sequence events or post-sequence events, as explained below.

As shown in FIG. 3, the event control 314a also includes the operator type drop down list 334a and the event specification text box 336a. The operator type drop down list 334a and the event specification text box 336a comprise controls that can add meaning to the overall segment query. By using these controls, the user can provide a definition for the event type selected in the event type drop down list 332a. Accordingly, in one embodiment, the operator type drop down list 334a includes a list of operators from which a user may choose.

The list of operators in the operator type drop down list 334a include various operators that specify a relationship between the event type drop down list 332a and the event specification text box 336a. In one or more embodiments, for example, the list of operators in the operator type drop down list 334a include, but are not limited to, "equals," "is not," "is at least," "is part of," or "includes." In one embodiment, the segment builder 202 provides another input control in place of the event specification text box 336a in response to the operator selected by the user, such as an input control that provides a list of specific event options. Thus, the segment builder 202 provides various combinations of controls within the event control 314a based on the user's selections.

As shown in FIG. 3, in response to the user selecting the event type "page 1" in the event type drop down list 332a—and the operator "equals" in the operator type drop down list 334a—the segment builder 202 provides the event specification text box 336a. In one or more embodiments, the user may specify an event in the event specification text box 336a that is of the same event type as that specified in the event type drop down list 332a. For example, as illustrated in FIG. 3, the user may enter the webpage "www.sportywear.com/Home" in the event specification text box 336a. Thus, the portion of the segment query built within the event control 314 specifies that the segment of users identified by the segment query will have visited the webpage, "www.sportywear.com/Home." In one or more embodiments, the segment builder 202 provides error checking for any value entered into the event specification text box 336a, such that an incorrect value may not be entered (e.g., if the event type is "page 1," the value entered into the event specification text box 336a may be a string of characters followed by ".htm," ".html," ".org," ".com," ".net," or some other Internet domain suffix).

Once the segment builder 202 detects the event control 314 is completed (e.g., the user has supplied the necessary information), the segment builder 202 provides further segment query building controls within the segment query canvas 306. For example, following the completion of the event control 314a, the segment builder 202 may provide a sequence control 316. In one or more embodiments, the sequence control 316 enables the user to specify a sequence. For example, once the segment builder 202 detects the event control 314a is complete, the segment builder 202 may provide a sequence operator drop down list 338, defaulted to a null character (e.g., "-").

To further narrow the segment query, in one or more embodiments, the sequence operator drop down list 338 includes a list of sequential operators from which the user may select. Sequential operators include, but are not limited to, "then," "while," "after," "then immediately," "before," "immediately before." In one or more embodiments, the sequential operator specified via the sequence operator drop down list 338 indicates to the segment builder 202 what further segment query building controls to provide within the segment query canvas 306. For example, in one embodiment, the "then" sequential operator, as shown in FIG. 3, indicates to the segment builder 202 to provide a second event control 314b, in which a user may specify a second event.

As indicated above, the analytics engine 104 can provide multiple segment query building controls to define a sequence of events. For example, the second event control 314b comprises a segment query building control for selecting a second event in a sequence of events. As shown in FIG. 3, the second event control 314b operates in the same way (and can comprise the same embodiments) as the event control 314a. For example, the second event control 314b includes an event type drop down list 332b, an operator type drop down list 334b, and an event specification text box 336b. Using components 332b-336b of the second event control 314b, the user has specified a second event in which "Page 2" "Equals" "www.sportywear.com/Men." In one or more embodiments, the segment builder 202 provides as many controls as requested by the user in order for the user to build a segment query directed to virtually any sequence of events, including third, fourth, or fifth event controls.

In addition to providing event controls, the analytics engine 104 optionally can also provide sequence condition controls to better define a sequential segment. As used in this disclosure, a "sequence condition" refers to a rule or expression that defines a relationship between two or more events. For example, a sequence condition is a rule or expression that defines an order, time, or other sequential relationship between two or more events. Additionally, a sequence condition may specify an order in which events take place or a time between events. Examples of sequence conditions include, but are not limited to, "then," "immediately then," "within," "before," "after," "immediately before," or "immediately after."

For example, the segment builder 202 may provide various drop-down lists that enable the user to apply conditions to a sequence of events. As shown in FIG. 3, the segment builder 202 provides a sequence condition control 340. By interacting with the sequence condition control 340, the user applies the condition "within 2 hours" to the sequence of events specified in the event controls 314a and 314b. The sequence condition control 340 is but one example of a sequence condition control.

In addition to sequence condition controls, in one or more embodiments, the analytics engine 104 provides a date control 341. By interacting with the date control 341, the user applies a date (or date range) to the sequence of events specified in the event controls 314a and 314b. In some embodiments the date control 341 provides an option to input a date range over multiple days, months, or years. Upon receiving an indication of a selected date (or date range) from the client device 112d, the segment builder 202 includes the selected date (or date range) in the segment query.

Continuing the example from above, if the user were to submit a segment query based on the event controls 314*a* and 314*b*, the sequence operator drop down list 338, and the sequence condition control 340 shown in FIG. 3, the resulting segment query would cause the analytics engine 104 to identify users who visited the webpage "www.sportywear.com/Home," then immediately visited the webpage "www.sportywear.com/Men" (but within two hours). Users identified in response to such a segment query may have visited other websites or performed various other events in between visiting on "www.sportywear.com/Home" and "www.sportywear.com/Men." To further narrow this sequential segment, the user would need to further specify conditions for the segment query using additional segment query building controls.

In addition to segment queries that specify a sequence of events, the analytics engine 104 also receives and processes segment queries that include a request to identify events that occurred before or after the specified sequence of events—that is, pre-sequence events or post-sequence events. The analytics engine 104 processes a segment query that include such a request for pre-sequence or post-sequence events without input from a user specifying such a request specific to the segment query through, for example, the various segment query building controls shown in FIG. 3. For example, in some embodiments, the segment builder 202 or the rule manager 206 adds a default request for pre-sequence or post-sequence events to the segment query without receiving a request for such events specific to the segment query (e.g., by adding a default request for any pre-sequence events that occurred twenty-four hours before an initial event or for any post sequence events that occurred twenty-four hours after a subsequent event).

While some default requests may call for any pre-sequence events or post-sequence events, in other embodiments, the analytics engine 104 receives and processes such default requests with more specificity. Indeed, in some embodiments, the segment builder 202 provides default segment query building controls that enable the user to specify parameters of any default request for pre-sequence or post-sequence events, including the type of event and timing of event in relation to the sequence of events. In one such embodiment, the segment builder 202 provides default segment query building controls similar to those shown within FIG. 3.

In addition to default requests for pre-sequence or post-sequence events, in some embodiments, the analytics engine 104 receives and processes requests specific to (and part of) a segment query. As shown in FIG. 3, for example, the segment builder 202 optionally provides a sequence peripheral control 312*a* and a sequence peripheral control 312*b* as segment query building controls that define a pre-sequence or post sequence event. In some embodiments, the segment builder 202 automatically provides the sequence peripheral controls 312*a* and 312*b* in response to receiving selections within the event controls 314*a* and 314*b*, respectively.

As shown in FIG. 3, the sequence peripheral control 312*a* includes several drop down lists, including an event type drop down list 322*a* and a sequence event drop down list 330*a*. The event type drop down list 322*a* includes each of the possible events available in the event type drop down list 332*a*. The event type drop down list 322*a*, however, further includes a catch-all option for "events" that indicates a request for all types of pre-sequence or post-sequence events. Relatedly, the sequence event drop down list 330*a* includes a list of each event within a specified sequence of events, such as the events specified in the event controls 314*a* and 314*b*. In some embodiments, the segment builder 202 limits the list of events within the sequence event drop down list 330*a* to events specified within the event controls 314*a* and 314*b* (or other event controls). By limiting the list of events within the sequence event drop down list 330*a*, the segment builder 202 restricts any pre-sequence or post-sequence event specified within the sequence peripheral control 312*a* to events that relate to a sequence of events.

The sequence peripheral control 312*a* includes additional drop down lists, including a numeric operator drop down list 323*a*, a numeric drop down list 324*a*, a time increment drop down list 326*a*, and a time operator drop down list 328*a*. The numeric operator drop down list 323*a* includes a list of operators that define a relationship with a following number (e.g., "within" or "only"); the numeric drop down list 324*a* includes a list of numbers (e.g., "1," "2," "3"); the time increment drop down list 326*a* includes time increments (e.g., "seconds," "minutes," "hours," "days," "months," "years"); and the time operator drop down list 328*a* includes a list of operators that define a time relationship (e.g., "before" and "after"). Each of the drop down lists 323*a*-328*a* provide options that facilitate defining a temporal relationship between a pre-sequence or post-sequence event and a sequence of events. Specifically, drop down lists 323*a*-328*a* enable a user to define when a pre-sequence or post-sequence event occurred in relation to an event within a sequence of events, such as an initial event or subsequent event.

For example, as shown in FIG. 3, the user selects an event, operator, number, time increment, operator, and sequence event from within the drop down lists 322*a*-330*a* to request any pre-sequence events in which a client device accesses an application within three hours before the client device visited "Page 1." In such an embodiment, the request for the pre-sequence event within the sequence peripheral control 312*a* is part of the segment query. In addition, in some embodiments, the segment builder 202 includes not only the request for specific pre-sequence or post-sequence events within a sequence peripheral control, but also a default request for a pre-sequence or post-sequence event within a default period of time, such as the default requests described above. By including a default request with a specific request for pre-sequence or post-sequence events, the segment builder 202 configures a segment query that produces a broader dataset and facilitates examining additional events associated with a sequence of events (e.g., by including the broader dataset within a report for the sequence of events).

As further illustrated in FIG. 3, the sequence peripheral control 312*b* includes the same type of drop down lists as the sequence peripheral control 312*a*. Specifically, the sequence peripheral control 312*b* includes an event type drop down list 322*b*, a numeric operator drop down list 323*b*, a numeric drop down list 324*b*, a time increment drop down list 326*b*, a time operator drop down list 328*b*, and a sequence event drop down list 330*b*. The drop down lists 322*b*-330*b* operate in the same way (and can comprise the same embodiments) as the drop down lists 322*a*-330*a*. As shown in FIG. 3, the user selects an event, operator, number, time increment, operator, and sequence event from within the drop down lists 322*b*-330*b* to request any post-sequence events in which a user performs an event within six hours after the client device visited "Page 2." In addition, in some embodiments, the analytics engine 104 provides additional segment query building controls that further define a type of pre-sequence or post-sequence event. For example, in some embodiments, the sequence peripheral controls 312*a* and 312*b* include sequence condition controls, dimension item value controls, or any other control within a segment canvas.

Accordingly, upon submission to the analytics engine 104, the full segment query illustrated in FIG. 3 would cause the analytics engine 104 to identify users in the analytics database 108 who visited "www.sportywear.com/Home," then immediately visited "www.sportywear.com/Men" (within two hours). But if the full segment query included the inputs within the optional sequence peripheral controls 312a and 312b, the query would also cause the analytics engine 104 to identify (in the analytics database 108) any pre-sequence events in which a user accessed an application within three hours before visiting "www.sportywear.com/Home," and any post-sequence events in which a user performed an event within six hours after the client device visited "www.sportywear.com/Men." As such, the analytics engine 104 provides the user with controls to create a specific segment query with a high level of granularity. Once the user has built the segment query, the client application 128 stores the segment query in the data storage 238 for later processing. Additionally, the client application 128 directs the client device 128 to send the segment query to the analytics engine 104 for processing.

Accordingly, FIG. 3 illustrates an embodiment of an advanced sequential segment query that includes a request for pre-sequence events and post-sequence events. In light of the disclosure herein, one of skill in the art will appreciate that advanced sequential segment queries (such as that shown in FIG. 3) and the corresponding query results allow a web administrator or marketer to more fully explore and capture a specific, granular segment.

As indicated above, the analytics engine 104 processes a segment query to provide query results. In one or more embodiments, the analytics engine 104 processes the segment query shown in FIG. 3 and provides query results to the client application 128. For example, as shown in FIG. 3, the segment generator 214 provides a results summary display 308 that the client application 128 displays within the segment query building GUI 300. The segment generator 214 provides query results for display in a variety of different ways. For example, the results summary display 308 can include textual and graphical elements that communicate the results to the user.

As shown in FIG. 3, the results summary display 308 included a variety of results. The results summary display 308 includes a broad overview of the query results. For example, in the "page views" category, the results summary display 308 shows that of 4,619 total page views, 881 page views are associated with information that matches the segment query defined in the segment query canvas 306. In other words, the results summary display 308 indicates 881 page views of the home page, "www.sportywear.com/Home" satisfy the segment query. Similarly, the results summary display 308 shows that of 5,123 total visits, 902 of those visits are associated with information that matches the segment query defined in the segment query canvas 306. Again, in this case, the results summary display 308 indicates 902 page visits of the home page satisfy the segment query, "www.sportywear.com/Home." Additionally, the results summary display 308 shows that of 4,364 unique visits, 457 of those unique visits are associated with information that matches the segment query defined in the segment query canvas 306.

As also shown in FIG. 3, the results summary display 308 shows query results graphically. Specifically, a results graphic 342 communicates the same results information in a non-textual manner. In some embodiments, the user interface manager 230 provides specific data points in response to a detected selection of any member within the results summary display 308. For example, the user interface manager 230 may provide more granular user data in response to a detected mouse-hover over the results graphic 342. In some additional or alternative embodiments, the user interface manager 230 may also provide full data lists on a separate GUI in response to a user clicking on a link within the results summary display 308.

In addition, in some embodiments, the analytics engine 104 provides options to view query results within a report. For example, the analytics engine 104 provides reports that enable a user to investigate a defined dataset. By providing such reports, the analytics engine 104 provides a set of options and tools to examine a defined dataset that responds to a segment query. For example, the analytics engine 104 provides reporting features that enable examination of users who performed some but not all events of a sequence of events (e.g., a report showing events performed by users who performed one or two events of a sequence of three events); a ranking of events performed by a segment of users before or after a sequence of events defined by the segment query (e.g., a report showing the five most common events performed by the segment of users immediately before or immediately after performing the sequence of events); or various dimensions associated with a segment of users or with users who performed some but not all events of a sequence of events (e.g., a report showing browsers used by or an age, gender, or geographic location of a segment of users).

As shown in FIG. 3, for example, the segment query building GUI 300 includes a flow report option 318 and a fallout report option 320. Upon receiving an indication that the user has selected either the flow report option 318, the segment generator 214 of the analytics engine 104 creates a corresponding flow report or a fallout report, respectively. This disclosure describes embodiments of a flow report and a fallout report below in connection with FIGS. 4A-4D and FIG. 5.

FIGS. 4A-4D illustrate various views of a flow report. A "flow report" shows various aspects of a defined dataset that is responsive to a segment query. For example, a flow report may include a representation of a sequence of events defined in a segment query and/or a representation of events performed by a segment of users before or after a sequence of events. In some embodiments, the flow report includes selectable options to view more details concerning a segment of users, a sequence of events, or pre-sequence or post-sequence events (e.g., selectable options to view dimensions associated with a segment of users).

Figure 4A:
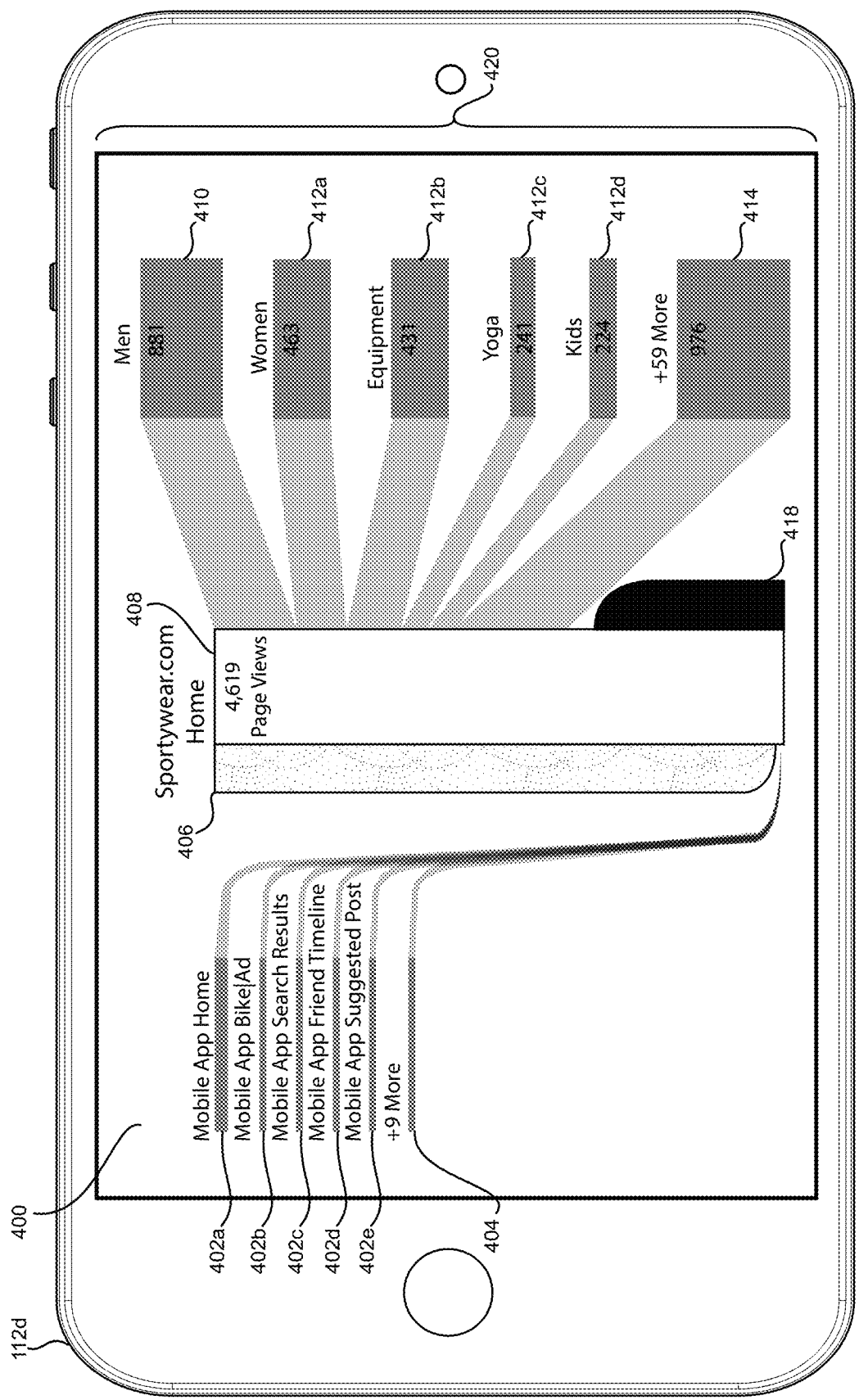
FIGS. 4A-4D illustrate a flow report in accordance with one or more embodiments.

As shown in FIG. 4A, the analytics engine 104 provides a flow report 400 for display on a graphical user interface 420 of the client device 112d. In some embodiments, the analytics engine 104 provides the flow report 400 in response to receiving an indication of a selection of the flow report option 318. As shown in FIG. 4A, the flow report 400 includes an initial event graphic 408 and a subsequent event graphic 410.

The initial event graphic 408 and the subsequent event graphic 410 are interactive graphical representations of events within a sequence of events. In particular, the initial event graphic 408 represents an initial event (i.e., viewing the homepage www.sportywear.com/Home) of the sequence of events defined by the segment query canvas 306. Conversely, the subsequent event graphic 410 represents a subsequent event (i.e., viewing the webpage www.sportywear.com/Men) of the sequence of events defined by the segment query canvas 306. As shown in FIG. 4A, a text within the initial event graphic 408 indicates that the homepage www.sportywear.com/Home received 4,619 total page views, whereas a text within the subsequent event graphic 410 indicates that the webpage www.sportywear.com/Men received 881 total views. In other words, the texts within the initial event graphic 408 and the subsequent event graphic 410 indicate that 881 page views of the webpage www.sportywear.com/Men match the sequence of events defined by the segment query within the segment query canvas 306.

As indicated above, the analytics engine 104 provides for display flow reports that show pre-sequence events or post-sequence events. FIG. 4A illustrates the flow report 400 with representations of certain pre-sequence events in various formats. For example, the flow report 400 includes pre-sequence-event graphics 402a-402e and a pre-sequence-events graphic 406. The pre-sequence-event graphics 402a-402e are interactive graphical representations of several events associated with a mobile application that occurred immediately before the 4,619 page views of the homepage. For example, a text above the pre-sequence-event application graphic 402a (i.e., "Mobile App Home") indicates that some of the segment of users who performed the sequence of events (i.e., viewed www.sportywear.com/Home then www.sportywear.com/Mean) viewed a mobile application home screen immediately before viewing the homepage www.sportywear.com/Home. The text above each of the remaining pre-sequence-event graphics 402b-402e likewise indicate a mobile application screen that the segment of users viewed immediately before viewing the homepage www.sportywear.com/Home.

In addition to providing reports that show pre-sequence or post-sequence events, the analytics engine 104 can provide reports that show a ranking of certain pre-sequence or post-sequence events or alternative events performed instead of a defined sequence of events. The report may show, for example, a ranking according to any criteria or dimension, including, but not limited to, most commonly performed pre-sequence or post-sequence events or least commonly performed pre-sequence or post-sequence events. As shown in FIG. 4A, for example, the analytics engine 104 provides the flow report 400 with a ranking of pre-sequence events associated with a mobile application. Specifically, the client device 112d displays the pre-sequence-event graphics 402a-402e from the graphic corresponding to a most commonly performed pre-sequence mobile application event (i.e., pre-sequence-event application graphic 402a) to the graphic corresponding to a fifth most commonly performed pre-sequence mobile application event (i.e., pre-sequence mobile application event 402e).

As part of the ranking, the flow report 400 further includes an additional pre-sequence-event graphic 404. In some embodiments, such as that shown in FIG. 4A, the analytics engine 104 provides a graphical representation of some (but not all) pre-sequence or post-sequence events and a graphical representation of other pre-sequence or post-sequence events that fall below a certain ranking or do not rank above a certain threshold. The additional pre-sequence-event graphic 404 provides an example of the latter. As shown in FIG. 4A, the additional pre-sequence-event graphic 404 is an interactive graphical representation of the next most commonly performed events associated with a mobile application that occurred immediately before the 4,619 page views of the homepage. In other words, the additional pre-sequence-event graphic 404 represents the sixth, seventh, and any additional ranking pre-sequence mobile application events.

As indicated above, the additional pre-sequence-event graphic 404 is an interactive graphical representation, as are all of components 402a-418 shown within FIG. 4A. A user may interact with any portion of a device screen 420 corresponding to an interactive graphical representation (e.g., by touch gesture, click, keyboard stroke, stylus) to request additional information related to the represented event, dimension, or other component. For example, when a user touches the portion of the device screen 420 corresponding to the additional pre-sequence-event graphic 404, the analytics engine 104 receives an indication that the user has selected the additional pre-sequence-event graphic 404 and provides additional information related to the next most commonly performed pre-sequence mobile application events for display within the graphical user interface 420. The analytics engine 104 may, for example, provide additional pre-sequence-event graphics representing each of the next most commonly performed pre-sequence mobile application events. This disclosure further describes interactive graphical representations below.

As noted above, the flow report 400 also includes the pre-sequence-events graphic 406. Whereas the pre-sequence-event graphics 402a-402e represent events associated with a mobile application that occurred immediately before the 4,619 page views of the homepage, the pre-sequence-events graphic 406 represents all other events that occurred immediately before the 4,619 page views of the homepage (e.g., within a six-hour time frame). In other words, the pre-sequence-events graphic 406 represents pre-sequence events that are not associated with a mobile application.

The pre-sequence-events graphic 406 is likewise an interactive graphical representation. Accordingly, upon receiving an indication that a user has selected the pre-sequence-events graphic 406, the analytics engine 104 provides additional information related to other pre-sequence events (that are not associated with a mobile application) for display within the graphical user interface 420. For example, under such circumstances, the analytics engine 104 may provide additional pre-sequence-event graphics that individually represent other types of pre-sequence events (e.g., view of another website, search within a search engine).

In addition to providing reports that show pre-sequence or post-sequence events or events within a sequence of events, the analytics engine 104 provides reports that show alternative events performed by users who performed some (but not all) events of a sequence of events. For example, the analytics engine 104 provides reports that show events performed by users who performed an initial event (but not a subsequent event) of a sequence of events defined within a segment query or, conversely, events performed by users who performed a subsequent event (but not an initial event) of a sequence of events defined within a segment query. As shown in FIG. 4A, for example, the flow report 400 includes alternative event graphics 412a-412d, an additional alternative events graphic 414, and a fallout events graphic 418. Each of the graphics 412a-412d, 414, and 418 represent an event (or events) performed by a user who performed the initial event (i.e., viewing the homepage www.sportywear.com/Home) of the sequence of events, but did not perform the subsequent event (i.e., viewing the webpage www.sportywear.com/Men) of the sequence of events defined by the segment query canvas 306.

For example, the alternative event graphics 412a-412d each represent the most commonly performed events performed by users immediately after viewing the homepage www.sportywear.com/Home-instead of viewing the webpage www.sportywear.com/Men. Similar to some of the pre-sequence-event graphics 402a-402e, the analytics engine 104 provides to the client device 112d the subsequent event graphic 410 and the alternative event graphics 412a-412d for display according to a ranking. Specifically, the flow report 400 shows the subsequent event graphic 410 and the alternative event graphics 412a-412d from the graphic corresponding to a most commonly performed event after viewing the homepage www.sportywear.com/Home (i.e., the subsequent event graphic 410) to the graphic corresponding to a fifth most commonly performed event after viewing the homepage but still within the larger website of www.sportywear.com (i.e., the alternative event graphic 412d).

Continuing the ranking in the preceding paragraph, the additional alternative events graphic 414 represents the next most commonly performed events performed by users immediately after viewing the homepage, but still within the larger website of www.sportywear.com. In other words, the additional alternative events graphic 414 represents the sixth, seventh, and any additional ranking events performed by users immediately after viewing the homepage.

By contrast, the fallout events graphic 418 represents events performed by users immediately after viewing the homepage outside of the larger website of www.sportywear.com. In other words, the fallout events graphic 418 represents fallout events, which are events that occurred outside a target, such as outside a target website or target mobile application. The fallout events graphic 418 is likewise an interactive graphical representation. Accordingly, upon receiving an indication that a user has selected fallout events graphic 418, the analytics engine 104 provides additional information related to the fallout events for display within the graphical user interface 420. For example, under such circumstances, the analytics engine 104 may provide additional alternative event graphics that individually represent events performed by users immediately after viewing the homepage but outside the larger website www.sportywear.com (e.g., viewing another website).

Figure 4B:
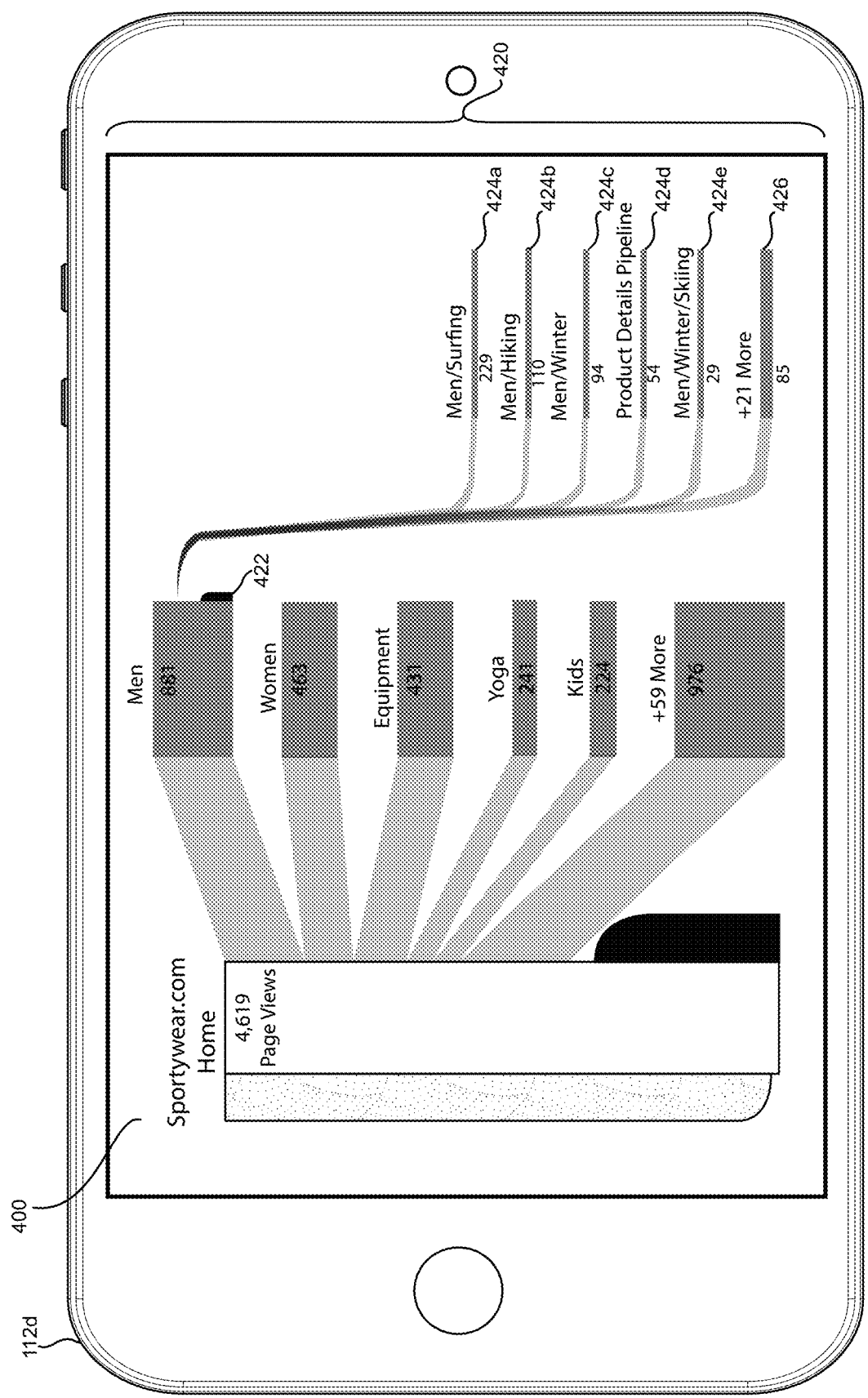
Figure 4C:
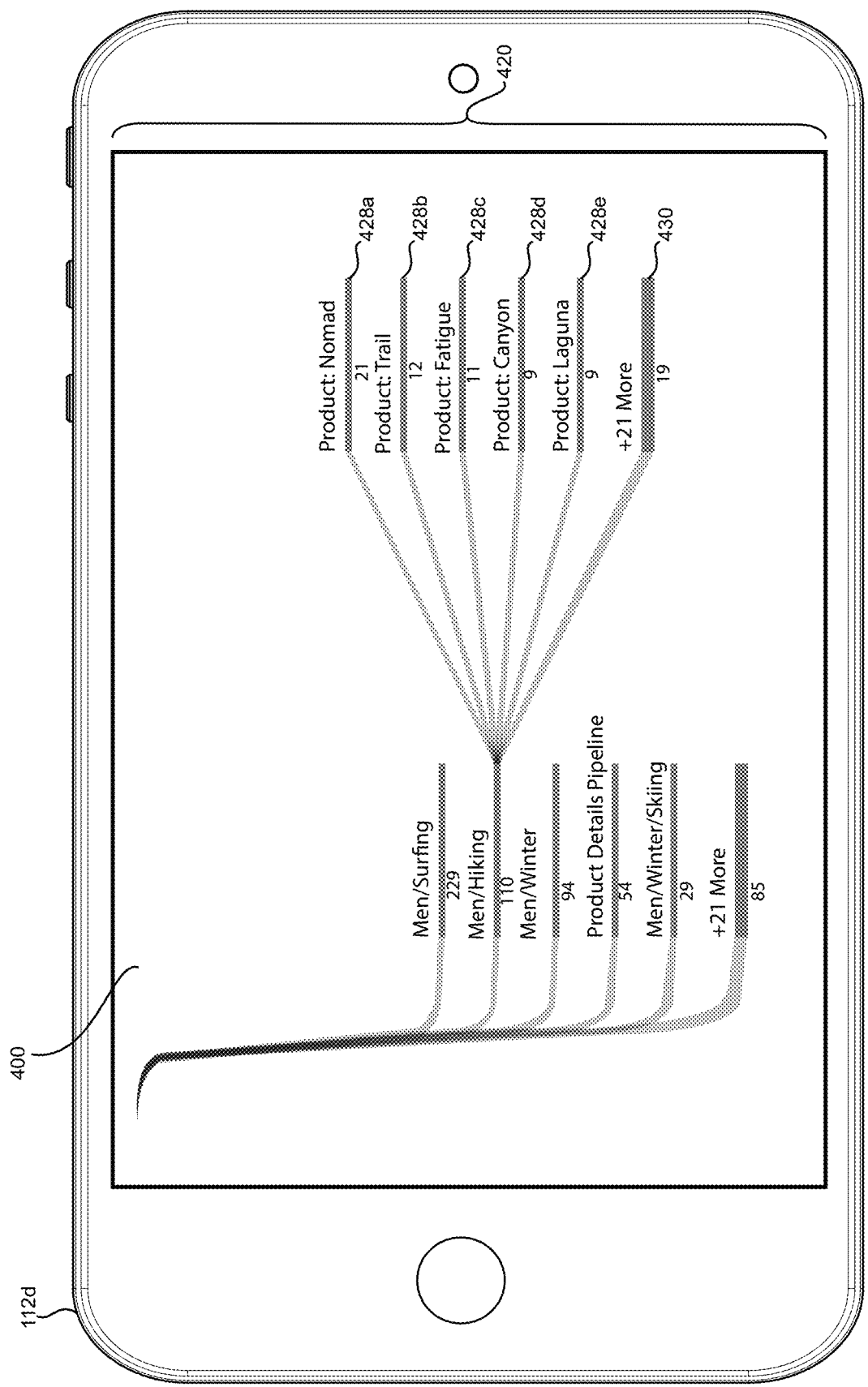

Turning now to FIGS. 4B-4C, these figures illustrate various views of the flow report 400 that features post-sequence events. FIGS. 4B-4C also illustrate reporting features that enable a user to further examine a defined dataset that is responsive to a segment query. In some embodiments, the analytics engine 104 provides a view of the flow report 400 shown in FIG. 4B in response to receiving an indication that the user has selected the subsequent event graphic 410.

As shown in FIG. 4B, the flow report 400 includes post-sequence-event graphics 424a-424e and a post-sequence-events graphic 426. The post-sequence-event graphics 424a-424e represent several events that occurred immediately after the 881 page views of the webpage www.sportywear.com. For example, a text above the post-sequence-event graphic 424a ("Men/Surfing") indicates that some of the segment of users who performed the sequence of events (i.e., viewed www.sportywear.com/Home then www.sportywear.com/Mean) viewed another webpage within the website immediately after viewing the webpage www.sportywear.com/Men. The text above each of the remaining post-sequence-event graphics 424a-424e likewise indicates an event that the segment of users performed immediately after viewing the webpage www.sportywear.com/Men.

The flow report 400 of FIG. 4B also includes an additional post-sequence events graphic 426. The additional post-sequence events graphic 426 represent less commonly performed post-sequence events. As in the previous view of the flow report 400, the analytics engine 104 provides both the post-sequence-event graphics 424a-424e and the additional post-sequence events graphic 426 for display according to a ranking. As shown in FIG. 4B, the analytics engine 104 also provides a fallout events graphic 422 that represents fall out events after viewing the webpage www.sportywear.com/Men (e.g., post-sequence events outside the website www.sportywear.com).

In this example, the flow report 400 shows the post-sequence-event graphics 424a-424e and the additional post-sequence events graphic 426 from the graphic corresponding to a most commonly performed event after viewing the webpage of www.sportywear.com/Men (i.e., the post-sequence-event graphic 424a) to the graphic corresponding to a fifth most commonly performed event after viewing the webpage of www.sportywear.com/Men (i.e., post-sequence-event graphic 424e). The additional post-sequence events graphic 426 represent the next most commonly performed events immediately after viewing the webpage of www.sportywear.com/Men.

FIG. 4C illustrates an additional layer of post-sequence events accessible within the flow report 400. FIG. 4C exemplifies how the analytics engine 104 provides multiple layers of pre-sequence or post-sequence events. In some embodiments, the analytics engine 104 provides a view of the flow report 400 shown in FIG. 4C in response to receiving an indication that the user has selected the post-sequence-event graphics 424b.

As shown in FIG. 4C, the flow report 400 includes post-sequence-event graphics 428a-428c and additional post-sequence events graphic 430 displayed in rank order. Specifically, the flow report 400 shows the post-sequence-event graphics 428a-428c and the additional post-sequence events graphic 430 from the graphic corresponding to a most commonly performed event after viewing the webpage of www.sportywear.com/Men/Hiking (i.e., the post-sequence-event graphic 428a) to the graphic corresponding to a set of the next most commonly performed events after viewing the webpage www.sportywear.com/Men/Hiking (i.e., additional post-sequence events graphic 430).

Figure 4D:
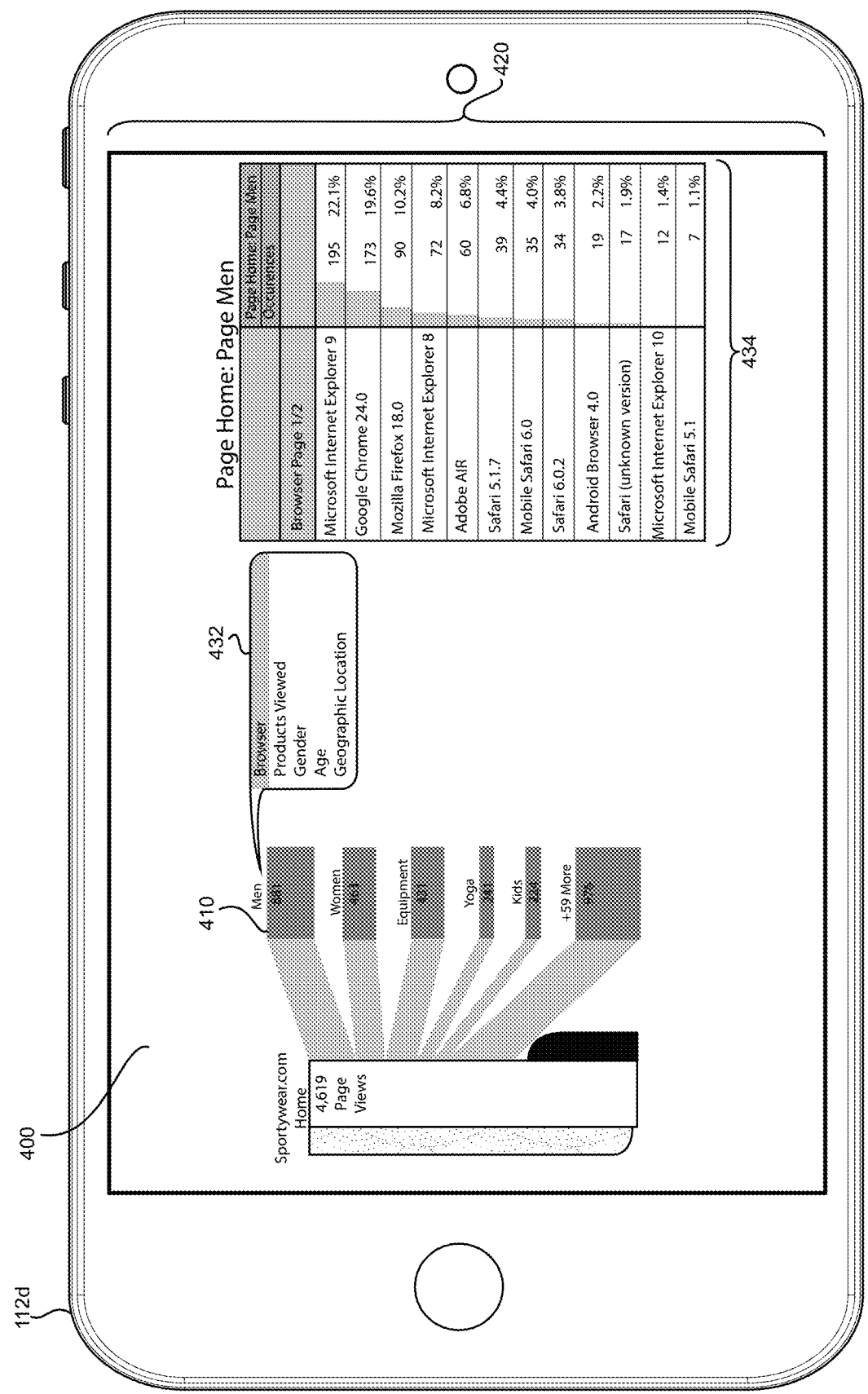

In addition to providing multiple layers of pre-sequence or post-sequence events, in one or more embodiments, the analytics engine 104 provides options to examine various dimensions of a defined dataset, such as dimensions associated with an event or segment of users. Indeed, in some embodiments, a flow report includes options to examine dimensions for any interactive graphical representation, including components 402a-430 shown in FIGS. 4A-4C. FIG. 4D illustrates a view of the report 400 that features an option to examine a dimension of an event.

As shown in FIG. 4D, the analytics engine 104 provides a dimension menu 432 associated with the subsequent event graphic 410. In some embodiments, the analytics engine 104 receives an indication that the user has selected the subsequent event graphic 410 using an alternative selection input (e.g., by right clicking with a mouse or by performing a force touch, touch-and-press, or other touch gesture) and—in response to receiving the input—the analytics engine 104 provides the dimension menu 432 as shown in FIG. 4D. The dimension menu 432 includes several dimension options from which a user may select to examine a dimension associated with the subsequent event. The dimension menu 432 includes a dimension option for "Browser," "Products Viewed," "Gender," "Age," and "Geographic Location." When selected, the dimension options respectively prompt the analytics engine 104 to provide information concerning a browser type, products viewed, gender, age, or geographic location associated with the segment of users who performed the sequence of events (i.e., viewed www.sportywear.com/Home then www.sportywear.com/Mean).

FIG. 4D illustrates an example of the type of information that the analytics engine 104 provides for display in response to receiving an indication of a selection of a dimension option. In response to receiving an indication that the user has selected the "Browser" dimension option, the analytics engine 104 provides a browser ranking list 434 for display within the graphical user interface 420. The browser ranking list 434 includes a list of browser types used by the segment of users who performed the sequence of events—defined by the segment query within the segment query canvas 306—including the version number of each browser. The browser ranking list 434 also lists each browser from the browser most commonly used by the segment of users to the browser least commonly used by the segment of users, including a number of users who used the browser and the percentage of users who used the browser.

FIG. 4D provides merely one example of additional information that the analytics engine 104 may provide to enable a user to examine a dimension related to a defined dataset. In alternative or additional embodiments, the analytics engine 104 provides options to examine dimensions related to each of the components 402a-430 shown in FIGS. 4A-4C, whether that dimension be products purchased, products viewed, webpages visited, or advertisement campaign viewed by the segment of users or some other dimension.

Figure 5:
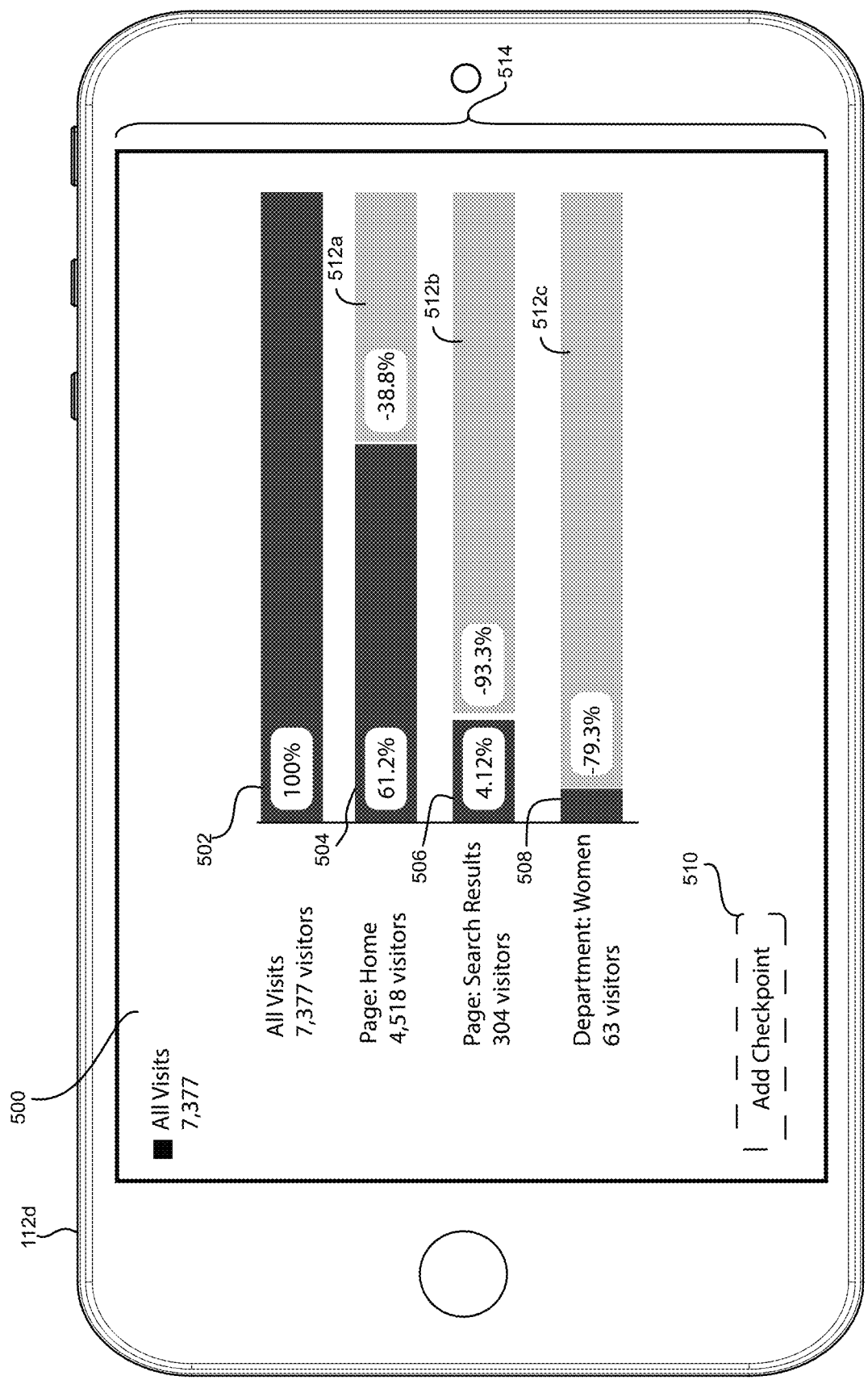
FIG. 5 illustrates a fallout report in accordance with one or more embodiments.

Turning now to FIG. 5, this figure illustrates an example of a fallout report. A "fallout report" shows various checkpoints from a defined dataset responsive to a segment query. A "checkpoint" is an event within a pathway. For example, a fallout report may show various checkpoints from within a defined dataset that track a series of webpages visited by a segment of users within a website. As another example, a fallout report may show various checkpoints from within a defined dataset that track a series of pages visited or functions performed by a segment of users within a mobile application. In some embodiments, a fallout report includes a representation of fallout events, events performed within a sequence of events defined by a segment query, or pre-sequence or post-sequence events.

As shown in FIG. 5, for example, the analytics engine 104 provides a fallout report 500 for display on a graphical user interface 514. In some embodiments, the analytics engine 104 provides the fallout report 500 in response to receiving an indication of a selection of a fallout report option, such as the fallout report option 320 shown in FIG. 3. The fallout report 500 shown in FIG. 5, however, does not correspond to the segment query built in the segment query canvas 306, but to another segment query. The fallout report 500 represents a portion of the defined dataset responsive to a segment query calling for an initial event of visiting a website homepage and a subsequent event of visiting a search results page within the website.

The fallout report 500 includes several checkpoints, including a website checkpoint 502, a homepage checkpoint 504, a search results checkpoint 506, and a women's department checkpoint 508. Each of the checkpoints 502-508 represent an event within a larger website, as follows: The website checkpoint 502 represents a total number of unique visits to any webpage within the website. The homepage checkpoint 504 represents a total number of unique visits to the website's homepage. The search results checkpoint 506 represents a total number of unique visits to a search results page within the website. The women's department checkpoint 508 represents a total number of unique visits to a women's department page within the website.

In addition to showing checkpoints, some fallout reports include representations of events that are part of a sequence of events or that are pre-sequence or post-sequence events. The fallout report 500 provides an example of one such embodiment. As shown in FIG. 5, the homepage checkpoint 504 and the search results checkpoint 506 each represent events from a sequence of events (defined by a segment query) in which the initial event comprises visiting the website's homepage and the subsequent event comprises visiting the search results page within the website. Below those two checkpoints 504 and 506, the women's department checkpoint 508 represents a post-sequence event of visiting the women's department page within the website.

In addition to checkpoints already shown within a fallout report, the analytics engine 104 provides an option to add a checkpoint, such as an add checkpoint option 510 shown in FIG. 5. In response to receiving an indication that a user has selected the add checkpoint option 510, the analytics engine 104 provides a menu or list of other potential checkpoints or a field to enter or search for an additional checkpoint within the defined dataset.

As shown in FIG. 5, the analytics engine 104 also provides a representation of fallout events for display within the graphical user interface 514. Specifically, the fallout report 500 includes fallout event graphics 512a-512c, each of which correspond to a checkpoint. The fallout event graphic 512a represents fallout events for users who performed some event other than visiting the homepage. Moreover, a text within the fallout event graphic 512a indicates that the corresponding fallout events represent a 38.8% reduction in unique visitors compared to the total number of unique visitors to the website. Similarly, the fallout event graphic 512b represents fallout events for users who performed some event other than visiting the search results page, with a 93.3% reduction in unique visitors compared to the number of unique visitors to the website's homepage. Likewise, the fallout event graphic 512c represents fallout events for users who performed some event other than visiting the women's department page, with a 79.3% reduction in unique visitors compared to the number of unique visitors to the search results page.

As indicated by the fallout event graphics 512a-512c, the fallout report 500 shows a progression of fallout events moving from the unique visits to the website's homepage to the unique visits to the women's department page. A web developer or marketer may use the statistics shown within the fallout report 500 to make changes to the website, such as by changing a layout of a certain webpage or changing options available on certain webpages. A fallout report can thus provide granular information concerning the use of a website or (similarly) an application to guide strategic decisions.

To facilitate examining additional information within the fallout report 500, each of the checkpoints 502-508 and fallout event graphics 512a-512c are interactive graphical representations. Accordingly, when the analytic engine 104 receives an indication that one of the checkpoints 502-508 or fallout event graphics 512a-512c has been selected, the analytics engine 104 provides for display additional information concerning the selected checkpoint or fallout event. For example, the analytics engine 104 may provide a dimension menu for a checkpoint or fallout event; a fallout event graphic for each type of fallout event (or a ranking of individual fallout events) represented by one of the fallout event graphics 512a-512c; or pre-sequence or post-sequence event graphics that represent additional pre-sequence or post-sequence events.

Figure 6:
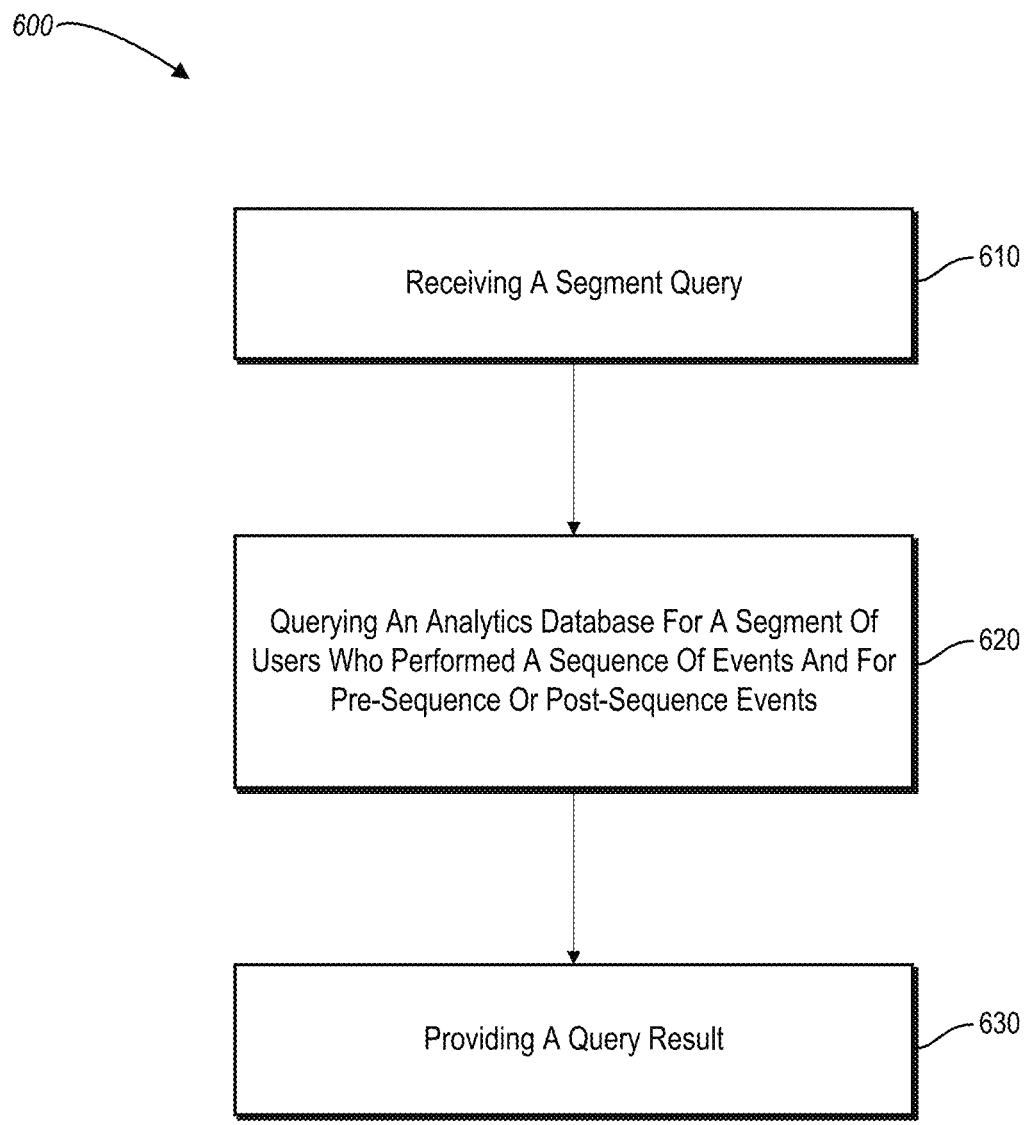
FIG. 6 illustrates a flowchart of a series of acts in a method for generating sequential segments that enable investigation of defined datasets in accordance with one or more embodiments.

FIGS. 1-5, the corresponding text, and the examples, provide a number of different systems and devices for creating sequential segments from analytics data that enable investigation of events that occurred before or after a sequence of events. In addition to the foregoing, embodiments can also be described in terms of flowcharts comprising acts and steps in a method for accomplishing a particular result. For example, FIG. 6 illustrates a flowchart of an exemplary method in accordance with one or more embodiments. The methods described in relation to FIGS. 6 and 7 may be performed with less or more steps/acts or the steps/acts may be performed in differing orders. Additionally, the steps/acts described herein may be repeated or performed in parallel with one another or in parallel with different instances of the same or similar steps/acts.

Turning now to FIG. 6, this figure illustrates a series of acts in a method 600 of generating sequential segments that enable investigation of defined datasets. As shown in FIG. 6, the method 600 includes an act 610 of receiving a segment query. For example, the act 610 can include receiving a segment query from a client device, the segment query comprising: an indication of a sequence of events and a request for events that occurred before or after the sequence of events. In one or more embodiments, receiving the segment query comprises receiving a request for events that occurred both before and after the sequence of events.

Additionally, in one or more embodiments, the sequence of events comprises an initial event followed by a subsequent event, wherein the indication of the sequence of events comprising the initial event followed by the subsequent event specifies actions performed by a user. Similarly, in one or more embodiments, the sequence of events comprises an initial event followed by a subsequent event followed by a post-subsequent event. Relatedly, in one or more embodiments, the actions performed by the user comprise one or more of requesting a webpage, downloading data, uploading data, instantiating an application, or submitting a transaction.

In one or more embodiments, the segment query further comprises a sequence condition defined by one or more dimensions. In some such embodiments, the sequence condition defined by one or more dimensions comprises a time-based sequence condition defining the events that occurred before or after the sequence of events to occur immediately before or immediately after the sequence of events.

As shown in FIG. 6, the method 600 also includes an act 620 of querying an analytics database for a segment of users who performed a sequence of events and for pre-sequence or post-sequence events. In particular, the act 610 can include querying an analytics database for a segment of users who performed the sequence of events and for instances of at least one event performed by the segment of users before or after the sequence of events. In one or more embodiments, the at least one event performed by the segment of users before or after the sequence of events comprises a plurality of events performed by the segment of users before or after the sequence of events.

As shown in FIG. 6, the method 600 also includes an act 630 of providing a query result. In particular, the act 630 can include providing a query result comprising the defined dataset. In one or more embodiments, the defined dataset comprises a ranking of the plurality of events performed by the segment of users before or after the sequence of events.

In one or more embodiments, act 630 involves providing options to examine the defined dataset in detail. For example, in one or more embodiments, providing the query result comprises providing the defined dataset in a format with options to examine the defined dataset. In some such embodiments, providing the defined dataset in the format with options to examine the defined dataset comprises providing a flow report option to display the defined dataset as a flow report within a graphical user interface of the client device, the computer-implemented method further comprising: receiving an indication from the client device of a selection of the flow report option; and providing the flow report for display within the graphical user interface, the flow report comprising: a representation of the sequence of events; and a representation of the instances of the plurality of events performed by the segment of users before or after the sequence of events.

Relatedly, in one or more embodiments, providing the defined dataset in the format with options to examine the defined dataset comprises providing a fallout report option to display the defined dataset as a fallout report within a graphical user interface of the client device, the computer-implemented method further comprising: receiving an indication from the client device of a selection of the fallout report option; and providing the fallout report for display within the graphical user interface, the fallout report comprising: a representation of the initial event performed by the segment of users; a representation of the subsequent event performed by the segment of users; and a representation of another event performed by a different segment of users who performed one or more events of the sequence of events. In some such embodiments, the fallout report further comprises: a representation of the instances of the at least one event performed by the segment of users after the sequence of events; and a representation of instances of at least another event performed by the segment of users after both the sequence of events and the at least one event.

In some additional or alternative embodiments, providing the defined dataset in the format with options to examine the defined dataset comprises providing for display within a graphical user interface of the client device a ranking of the plurality of events performed by the segment of users before or after the sequence of events.

Relatedly, in some additional or alternative embodiments, providing the defined dataset in the format with options to examine the defined dataset comprises providing a dimension option to display, within a graphical user interface of the client device, a dimension associated with the segment of users, the computer-implemented method further comprising: receiving an indication from the client device of a selection of the dimension option and an indication of a particular dimension associated with the segment of users; and providing for display within the graphical user interface the particular dimension associated with the segment of users.

Figure 7:
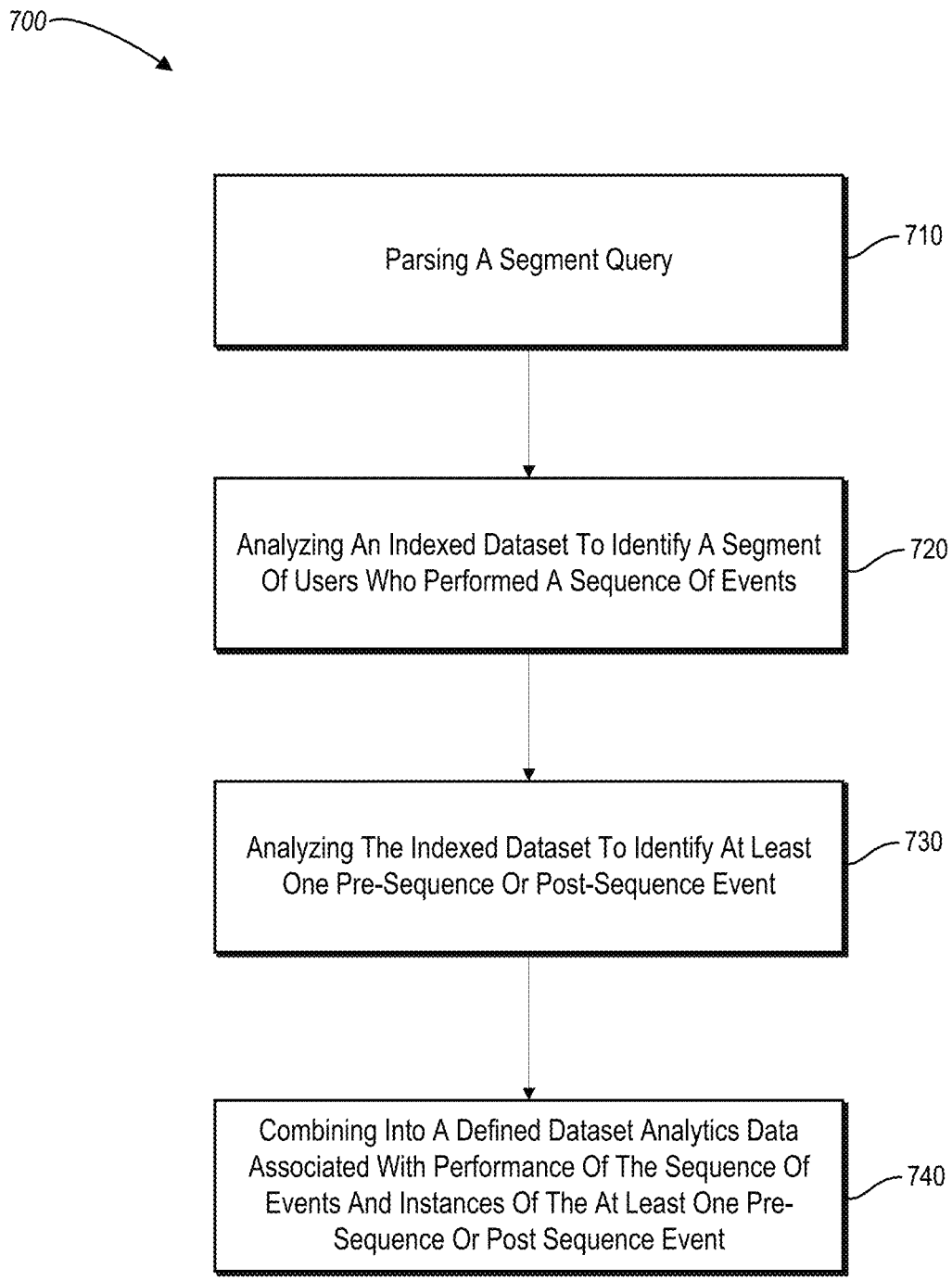
FIG. 7 illustrates an algorithm comprising a series of acts corresponding to a step for generating a defined dataset from an analytics database in accordance with one or more embodiments.

In some embodiments, the method 600 includes one or more steps for generating a defined dataset from an analytics database. In some such embodiments, the defined dataset comprises analytics data associated with performance of the sequence of events by a segment of users and instances of at least one event performed by the segment of users before or after the sequence of events. FIG. 7 illustrates an algorithm that comprises acts that correspond to the step for generating a defined dataset from an analytics database.

Specifically, FIG. 7 illustrates the algorithm 700 corresponding to one embodiment of performing a step for generating a defined dataset from an analytics database. In some such embodiments, the defined dataset comprises analytics data associated with performance of the sequence of events by a segment of users and instances of at least one event performed by the segment of users before or after the sequence of events. While FIG. 7 illustrates an algorithm according to one embodiment, alternative embodiments may omit, add to, reorder, and/or modify any of the acts shown in FIG. 7. Further, the analytics engine 104, the client device 112d, or a combination of both, may perform one or more of the acts of the algorithm 700.

As shown in FIG. 7, the algorithm 700 includes an act 710 of parsing a segment query. In one or more embodiments, the act 710 includes parsing the segment query by separating the segment query into portions for analysis. For example, in some embodiments, the act 710 includes parsing the segment query by separating an indication of a sequence of events as a portion of the segment query and separating a request for events that occurred before or after the sequence of events as a portion of the segment query. Additionally, in some embodiments, the act 710 includes parsing the segment query by determining whether the segment query satisfies various rules of structure and format for segment queries submitted to a database.

As also shown in FIG. 7, the algorithm 700 includes an act 720 of analyzing a dataset to identify a segment of users who performed a sequence of events. In one or more embodiments, the act 720 includes analyzing the dataset to identify the segment of users who performed the sequence of events by iterating through row-level transactional data within the dataset. In one or more embodiments, the dataset comprises data indexed by transaction, including any event performed by users and tracked by the analytics system 102.

As also shown in FIG. 7, the algorithm 700 includes an act 730 of analyzing the dataset to identify at least one pre-sequence or post-sequence event. In one or more embodiments, the act 720 includes analyzing the dataset to identify the at least one pre-sequence or post-sequence event by iterating through each user of the segment of users within the dataset.

As also shown in FIG. 7, the algorithm 700 includes an act 740 of combining into a defined dataset analytics data associated with performance of the sequence of events and instances of the at least one pre-sequence or post-sequence event.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In one or more embodiments, computer-executable instructions are executed on a general purpose computer to turn the general purpose computer into a special purpose computer implementing elements of the disclosure. The computer executable instructions may be, for example, binaries, intermediate format instructions such as assembly language, or even source code. Although the subject matter has been described in language specific to structural marketing features and/or methodological acts, it is to be understood that the subject matter defined in the appended claims is not necessarily limited to the described marketing features or acts described above. Rather, the described marketing features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as an un-subscription model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing un-subscription model can be composed of various characteristics such as, for example, on-demand self-service, broad network access, resource pooling, rapid elasticity, measured service, and so forth. A cloud-computing un-subscription model can also expose various service un-subscription models, such as, for example, Software as a Service ("SaaS"), a web service, Platform as a Service ("PaaS"), and Infrastructure as a Service ("IaaS"). A cloud-computing un-subscription model can also be deployed using different deployment un-subscription models such as private cloud, community cloud, public cloud, hybrid cloud, and so forth. In this description and in the claims, a "cloud-computing environment" is an environment in which cloud computing is employed.

Figure 8:
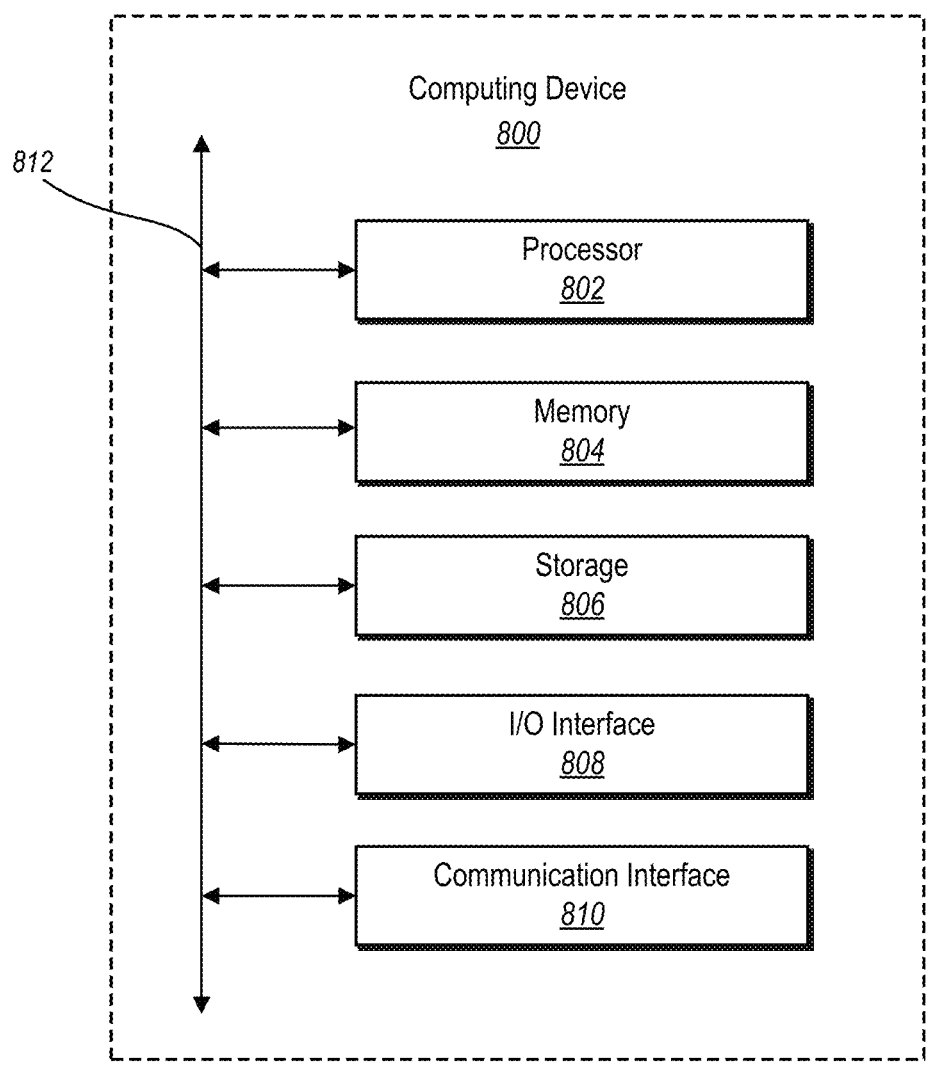
FIG. 8 illustrates a block diagram of a computing device in accordance with one or more embodiments.

FIG. 8 illustrates a block diagram of exemplary computing device 800 that may be configured to perform one or more of the processes described above. As shown by FIG. 8, the computing device 800 can comprise a processor 802, a memory 804, a storage device 806, an I/O interface 808, and a communication interface 810, which may be communicatively coupled by way of a communication infrastructure 812. In certain embodiments, the computing device 800 can include fewer or more components than those shown in FIG. 8. Components of the computing device 800 shown in FIG. 8 will now be described in additional detail.

In one or more embodiments, the processor 802 includes hardware for executing instructions, such as those making up a computer program. As an example and not by way of limitation, to execute instructions for digitizing real-world objects, the processor 802 may retrieve (or fetch) the instructions from an internal register, an internal cache, the memory 804, or the storage device 806 and decode and execute them. The memory 804 may be a volatile or non-volatile memory used for storing data, metadata, and programs for execution by the processor(s). The storage device 806 includes storage, such as a hard disk, flash disk drive, or other digital storage device, for storing data or instructions related to object digitizing processes (e.g., digital scans, digital models). For example, the memory 804 can store the analytics database 108.

The I/O interface 808 allows a user to provide input to, receive output from, and otherwise transfer data to and receive data from computing device 800. The I/O interface 808 may include a mouse, a keypad or a keyboard, a touch screen, a camera, an optical scanner, network interface, modem, other known I/O devices or a combination of such I/O interfaces. The I/O interface 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 808 is configured to provide graphical data to a display for presentation to a user. The graphical data may be representative of one or more graphical user interfaces and/or any other graphical content as may serve a particular implementation.

The communication interface 810 can include hardware, software, or both. In any event, the communication interface 810 can provide one or more interfaces for communication (such as, for example, packet-based communication) between the computing device 800 and one or more other computing devices or networks. As an example and not by way of limitation, the communication interface 810 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 810 may facilitate communications with various types of wired or wireless networks. The communication interface 810 may also facilitate communications using various communication protocols. The communication infrastructure 812 may also include hardware, software, or both that couples components of the computing device 800 to each other. For example, the communication interface 810 may use one or more networks and/or protocols to enable a plurality of computing devices connected by a particular infrastructure to communicate with each other to perform one or more aspects of the digitizing processes described herein. To illustrate, the image compression process can allow a plurality of devices (e.g., server devices for performing image processing tasks of a large number of images) to exchange information using various communication networks and protocols for exchanging information about a selected workflow and image data for a plurality of images.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A computer-implemented method comprising:

receiving, from a client device via a segment generation user interface, a segment query comprising:
- an indication of a sequence of web site events performed by a segment of users and comprising an initial event of a first webpage and a subsequent event of a second webpage; and
- a request for pre-sequence website events performed by the segment of users that occurred before the sequence of website events or post-sequence website events performed by the segment of users that occurred after the sequence of website events;

a step for generating a defined dataset from an analytics database, the defined dataset comprising analytics data associated with performance of the sequence of website events by the segment of users and instances of at least one event performed by the segment of users before or after the sequence of website events;

providing, for display within the segment generation user interface, a query result comprising the defined dataset and an interactive results graphic comprising graphics representing different website event types of the initial event of the first webpage that, as defined by the segment query, occur after the pre-sequence website events performed by the segment of users or occur before the post-sequence web site events performed by the segment of users; and based on a selection of a selectable option within the segment generation user interface, providing data that causes a display of the client device to transition from the segment generation user interface to an additional graphical user interface comprising a first set of interactive event graphics depicting the sequence of website events performed by the segment of users and a second set of interactive event graphics depicting either pre-sequence website events or post-sequence website events displayed according to rankings of most commonly performed pre-sequence website events or post-sequence web site or application events.

2. The computer-implemented method of claim 1, wherein the sequence of website events comprises the initial event of the first webpage defined by the segment query to include a set of one or more event parameters from the segment generation user interface and the subsequent event of the second webpage defined by the segment query to include a different set of one or more event parameters from the segment generation user interface.

3. The computer-implemented method of claim 1, wherein receiving the segment query comprises receiving a sequence-of-time condition that defines a timing relationship between the initial event of the first webpage and the subsequent event of the second webpage from within the segment generation user interface.

4. The computer-implemented method of claim 1, further comprising, based on detecting an interaction by the client device with the interactive results graphic, providing, for display on the client device, additional information within the segment generation user interface about at least one pre-sequence website event depicted as a website event type from the different website event types or at least one post-sequence website event depicted as the website event type from the different website event types.

5. The computer-implemented method of claim 1, further comprising:
- prior to receiving the segment query, providing, to the client device, the segment generation user interface comprising one or more segment query building controls; and
- wherein receiving the segment query comprises receiving an indication from the client device of the one or more segment query building controls selected via the segment generation user interface.

6. The computer-implemented method of claim 1, wherein providing data that causes the display of the client device to transition from the segment generation user interface to the additional graphical user interface further comprises causing the display via a mobile application of the second set of interactive event graphics and an additional interactive event graphic depicting either pre-sequence website events or post-sequence website events.

7. A non-transitory computer readable storage medium comprising instructions that, when executed by at least one processor, cause a system to:

receive, from a client device via a segment generation user interface, a segment query comprising:
- an indication of a sequence of web site events performed by a segment of users and comprising an initial event of a first webpage and a subsequent event of a second webpage; and
- a request for pre-sequence website events performed by the segment of users that occurred before the sequence of web site events or post-sequence website events performed by the segment of users that occurred after the sequence of website events;

based on the segment query, analyze a dataset within an analytics database to identify the segment of users who performed the sequence of website events;

analyze the dataset within the analytics database to identify at least one pre-sequence website event performed by the segment of users before the sequence of website events or at least one post-sequence website event performed by the segment of users after the sequence of website events;

combine, into a defined dataset, analytics data associated with performance of the sequence of website events by the segment of users and instances of the at least one pre- sequence website event or the at least one post-sequence website event performed by the segment of users;

provide, for display within the segment generation user interface, a query result comprising the defined dataset and an interactive results graphic comprising graphics representing different website event types of the initial event of the first webpage that, as defined by the segment query, occur after the at least one pre-sequence website event performed by the segment of users or occur before the at least one post-sequence web site event performed by the segment of users; and based on a selection of a selectable option within the segment generation user interface, provide data that causes a display of the client device to transition from the segment generation user interface to an additional graphical user interface comprising a first set of interactive event graphics depicting the sequence of website events performed by the segment of users and a second set of interactive event graphics depicting either pre-sequence website events or post-sequence website events displayed according to rankings of most commonly performed pre-sequence website events or post-sequence web site or application events.

8. The non-transitory computer readable storage medium of claim 7, wherein the at least one pre-sequence website event or the at least one post-sequence website event performed by the segment of users comprises a plurality of website events performed by the segment of users before or after the sequence of website events.

9. The non-transitory computer readable storage medium of claim 7, wherein the indication of the sequence of website events of the segment of users comprises an initial page view event and a subsequent page view event.

10. The non-transitory computer readable storage medium of claim 7, further comprising instructions that, when executed by the at least one processor, cause the system to combine, into the defined dataset, the analytics data and the instances of the at least one pre-sequence website event or the at least one post-sequence website event by combining, into the defined dataset, analytics data associated with performance of one or more events of the sequence of website events and the instances of the at least one pre-sequence website or application event or the at least one post-sequence website event.

11. The non-transitory computer readable storage medium of claim 7, further comprising instructions that, when executed by the at least one processor, cause the system to:
provide a flow report option to display the defined dataset as a flow report within a graphical user interface of the client device;
receive an indication from the client device of a selection of the flow report option; and
provide the flow report for display within the graphical user interface, the flow report comprising a first event graphic representing the initial event of the first webpage and a second event graphic representing the subsequent event of the second webpage.

12. The non-transitory computer readable storage medium of claim 7, further comprising instructions that, when executed by the at least one processor, cause the system to:
provide a fallout report option to display the defined dataset as a fallout report within a graphical user interface of the client device;
receive an indication from the client device of a selection of the fallout report option; and
provide the fallout report for display within the graphical user interface, the fallout report comprising a graphical representation of the initial event of the first webpage or the subsequent event of the second webpage and a representation of a set of one or more fallout events performed, instead of the initial event or the subsequent event, by a set of users differing from the segment of users.

13. The non-transitory computer readable storage medium of claim 12, wherein the fallout report further comprises an interactive graphical representation of the instances of the at least one post-sequence website event performed by the segment of users after the sequence of website or application events.

14. The non-transitory computer readable storage medium of claim 7, further comprising instructions that, when executed by the at least one processor, cause the system to receive the segment query comprising a sequence-of-time condition that defines a timing relationship between the initial event of the first webpage and the subsequent event of the second webpage based on a user selection, within the segment generation user interface, of a sequence operator of a plurality of sequence operators.

15. The non-transitory computer readable storage medium of claim 10, further comprising instructions that, when executed by the at least one processor, cause the system to:
provide a dimension option to display, within a graphical user interface of the client device, a dimension associated with the segment of users;
receive an indication from the client device of a selection of the dimension option and an indication of a particular dimension associated with the segment of users; and
provide for display within the graphical user interface the particular dimension associated with the segment of users.

16. A system comprising:
at least one processor; and
at least one non-transitory computer memory comprising a dataset within an analytics database, and instructions that, when executed by the at least one processor, cause the system to:
receive, from a client device via a segment generation user interface, a segment query comprising:
an indication of a sequence of web site events performed by a segment of users and comprising an initial event of a first webpage and a subsequent event of a second webpage; and
a request for pre-sequence website events performed by the segment of users that occurred before the sequence of web site events or post-sequence website events performed by the segment of users that occurred after the sequence of website events;
based on the segment query, analyze a dataset within an analytics database to identify the segment of users who performed the sequence of website events by iterating through row-level transactional data within the dataset;
analyze the dataset within the analytics database to identify at least one pre-sequence website event performed by the segment of users before the sequence of website events or at least one post-sequence website event performed by the segment of users after the sequence of web site events by iterating through each user of the segment of users;
combine, into a defined dataset, analytics data associated with performance of the sequence of website events by the segment of users and instances of the at least one pre- sequence website event or the at least one post-sequence website event performed by the segment of users;
provide, for display within the segment generation user interface, a query result comprising the defined dataset, and an interactive results graphic comprising graphics representing different website event types of the initial event of the first webpage that, as defined by the segment query, occur after the pre-sequence website events performed by the segment of users or occur before the post-sequence website events performed by the segment of users; and
based on a selection of a selectable option within the segment generation user interface, providing data that causes a display of the client device to transition from the segment generation user interface to an additional graphical user interface comprising a first set of interactive event graphics depicting the sequence of website events performed by the segment of users and a second set of interactive event graphics depicting either pre-sequence website events or post-sequence website events displayed according to rankings of most commonly performed pre-sequence website events or post-sequence web site events.

17. The system of claim 16, wherein the sequence of website events is further defined by the segment query to include a post-subsequent website event following the subsequent event of the second webpage.

18. The system of claim 17, further comprising instructions that, when executed by the at least one processor, cause the system to combine, into the defined dataset, analytics data associated with performance of one or more website events of the sequence of website events and the instances of the at least one pre-sequence website event or the at least one post-sequence website event.

19. The system of claim 17, wherein the segment query further comprises a sequence condition defined by one or more dimensions.

20. The system of claim 19, further comprising instructions that, when executed by the at least one processor, cause the system to receive the segment query by receiving a request for both the pre-sequence website events that occurred before the sequence of website events and the post-sequence website events that occurred after the sequence of website events.

\* \* \* \* \*